(12) United States Patent
Jung et al.

(10) Patent No.: US 10,733,921 B2
(45) Date of Patent: Aug. 4, 2020

(54) DISPLAY APPARATUS, VEHICLE HAVING THE SAME, AND CONTROL METHOD THEREOF

(71) Applicants: HYUNDAI MOTOR COMPANY, Seoul (KR); KIA MOTORS CORPORATION, Seoul (KR)

(72) Inventors: Seul-A Jung, Hwaseong-Si (KR); Juhyuk Kim, Seongnam-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/205,001

(22) Filed: Nov. 29, 2018

(65) Prior Publication Data

US 2020/0074897 A1   Mar. 5, 2020

(30) Foreign Application Priority Data

Sep. 4, 2018  (KR) .......................... 10-2018-0105290

(51) Int. Cl.
*G09G 3/00* (2006.01)
*G02B 27/00* (2006.01)
(Continued)

(52) U.S. Cl.
CPC ............. *G09G 3/003* (2013.01); *B60K 35/00* (2013.01); *G01C 21/30* (2013.01);
(Continued)

(58) Field of Classification Search
CPC .. G09G 3/003; G09G 2354/00; G09G 3/3648; G09G 2320/0247; G09G 2380/10; B60K 35/00; B60K 2370/736; B60K 2370/1531; B60K 2370/52; B60K 2370/25; B60K 2370/149; B60K 37/02; G02B 27/0093; G02B 27/2214; G02B 30/27; G02B 27/0101; G02B 30/31; G02B 2027/0138; G02B 2027/014;
(Continued)

(56) References Cited

U.S. PATENT DOCUMENTS 5,920,256 A * 7/1999 Toffolo .................. G01D 13/10
340/461
6,181,301 B1 * 1/2001 Inoguchi ................ B60K 37/02
345/5

(Continued)

*Primary Examiner* — Grant Sitta
(74) *Attorney, Agent, or Firm* — Morgan, Lewis & Bockius LLP

(57) ABSTRACT

A vehicle includes: a cluster including a display panel, and a barrier panel disposed adjacent the display panel and having a plurality of barriers; an image obtainer acquiring an image; a steering wheel disposed adjacent the cluster and the image obtainer; and a controller configured to determine whether or not a condition for performing a three-dimensional image mode is satisfied based on a manipulation state of the steering wheel, to control operations of the display panel and the barrier panel to recognize a user's line of sight based on the image of the image obtainer, perform the three-dimensional image mode based on the recognized line of sight of the user when the condition is satisfied, and to control the operations of the display panel and the barrier panel to perform a two-dimensional image mode when the is not satisfied.

21 Claims, 17 Drawing Sheets

(51) Int. Cl.

| | | |
|---|---|---|
| *G01C 21/30* | (2006.01) | |
| *B60K 35/00* | (2006.01) | |
| *G02B 30/27* | (2020.01) | |
| *B60R 11/00* | (2006.01) | |
| *G09G 3/36* | (2006.01) | |
| *B60Q 1/34* | (2006.01) | |
| *B60R 11/04* | (2006.01) | |

(52) U.S. Cl.
CPC ......... *G02B 27/0093* (2013.01); *G02B 30/27* (2020.01); *B60K 2370/1531* (2019.05); *B60K 2370/52* (2019.05); *B60K 2370/736* (2019.05); *B60Q 1/343* (2013.01); *B60R 11/04* (2013.01); *B60R 2011/0005* (2013.01); *B60R 2011/0043* (2013.01); *G09G 3/3648* (2013.01); *G09G 2320/0247* (2013.01); *G09G 2354/00* (2013.01); *G09G 2380/10* (2013.01)

(58) Field of Classification Search
CPC .... G02B 2027/0136; G02B 2027/0134; G01C 21/30; B60R 11/04; B60R 2011/0043; B60R 2011/0005; B60Q 1/343
See application file for complete search history.

(56) References Cited

U.S. PATENT DOCUMENTS

| | | | |
|---|---|---|---|
| 7,382,237 B2* | 6/2008 | Stoschek | B60K 35/00 340/438 |
| 9,120,379 B2* | 9/2015 | Wunsche | B60K 35/00 |
| 9,511,790 B2* | 12/2016 | Spaggiari | B60Q 1/0082 |
| 2006/0092521 A1* | 5/2006 | Birman | G01D 11/28 359/630 |
| 2007/0062753 A1* | 3/2007 | Yoshida | B60T 7/085 180/333 |
| 2011/0032252 A1* | 2/2011 | Ohta | H04N 13/398 345/419 |
| 2012/0221200 A1* | 8/2012 | Golomb | B62D 1/046 701/36 |
| 2012/0319828 A1* | 12/2012 | Krauss | B62D 1/046 340/425.5 |
| 2015/0084764 A1* | 3/2015 | Wunsche | B60K 35/00 340/462 |
| 2016/0274373 A1* | 9/2016 | Suzuki | G09G 3/3648 |
| 2017/0046880 A1* | 2/2017 | Kasazumi | G06T 19/006 |
| 2019/0100145 A1* | 4/2019 | Chen | B60K 35/00 |
| 2019/0101405 A1* | 4/2019 | Feng | G01C 21/3638 |

* cited by examiner

DISPLAY APPARATUS, VEHICLE HAVING THE SAME, AND CONTROL METHOD THEREOF

CROSS-REFERENCE TO RELATED APPLICATION(S)

This application is based on and claims the benefit of priority to Korean Patent Application No. 10-2018-0105290, filed on Sep. 4, 2018 in the Korean Intellectual Property Office, the disclosure of which is incorporated by reference herein in its entirety.

TECHNICAL FIELD

The present disclosure relates to a display apparatus for displaying a two-dimensional image or three-dimensional image, a vehicle having the same, and a control method thereof.

BACKGROUND

A vehicle is a means of transportation for moving by driving wheels on the road.

Such a vehicle can display a variety of information including driving information and vehicle state information through a cluster so that a user can recognize the driving information and the state of the vehicle.

The cluster is generally placed adjacent to a driver's seat on a dashboard, and warning lamps and dial devices may be provided in the cluster.

The dial devices include a tachometer, a speedometer, a trochometer, an odometer, a cooling water thermometer, and a fuel meter. The warning lamps include a battery warning lamp, an engine oil warning lamp, a low fuel warning lamp, a safety belt warning lamp and a door open warning lamp, and further include indicators such as direction indicators, a headlamp indicator, and an indicator of an automatic shift selector lever.

The cluster may be implemented in a digital manner.

Recently, the cluster is implemented using a display device to selectively display various kinds of information.

SUMMARY

It is an aspect of the present disclosure to provide a display device for displaying a two-dimensional image or a three-dimensional image corresponding to whether or not a user's line of sight is recognized, a vehicle having the same, and a control method thereof.

It is another aspect of the present disclosure to provide a display device for adjusting or fixing barriers of a barrier panel for displaying a three-dimensional image corresponding to whether or not a user's line of sight is recognized, a vehicle having the same, and a control method thereof.

It is another aspect of the present disclosure to provide a display device for displaying a two-dimensional image or a three-dimensional image corresponding to a manipulation of a steering wheel and adjusting barriers corresponding to a position of a user's line of sight when displaying the three-dimensional image, a vehicle having the same, and a control method thereof.

Additional aspects of the present disclosure will be set forth in part in the description which follows and, in part, will be obvious from the description, or may be learned by practice of the disclosure.

In accordance with one aspect of the present disclosure, a vehicle includes: a cluster including a display panel, and a barrier panel disposed adjacent the display panel and having a plurality of barriers; an image obtainer disposed adjacent the cluster to acquire an image; a steering wheel disposed adjacent the cluster and the image obtainer; and a controller configured to determine whether or not a condition for performing a three-dimensional image mode is satisfied based on a manipulation state of the steering wheel, to control operations of the display panel and the barrier panel to recognize a user's line of sight based on the image of the image obtainer, to perform the three-dimensional image mode based on the recognized line of sight of the user when the condition for performing the three-dimensional image mode is satisfied, and to control the operations of the display panel and the barrier panel to perform a two-dimensional image mode when the condition for performing the three-dimensional image mode is not satisfied.

The controller, when controlling the three-dimensional image mode, adjusts positions of the plurality of barriers based on the recognized line of sight of the user and controls the display panel to output a three-dimensional image.

The controller, when controlling the two-dimensional image mode, controls the barrier panel to be turned off and controls the display panel to output a two-dimensional image.

The vehicle further includes a detector to detect a rotation angle of the steering wheel, wherein the controller determines that the condition for performing the three-dimensional image mode is satisfied when the detected rotation angle of the steering wheel is within a preset angle range.

The vehicle further includes a lever to receive a turn-on command of a direction indicator, wherein the controller determines that the condition for performing the three-dimensional image mode is not satisfied when the turn-on command of the direction indicator is received by the lever.

The vehicle further includes a vehicle terminal to perform a navigation mode, wherein the controller, when navigation information is received from the vehicle terminal, determines whether or not the received navigation information includes change information of a driving direction within a predetermined distance, and determines that the condition for performing the three-dimensional image mode is not satisfied when the received navigation information includes the change information of the driving direction within the predetermined distance.

The controller determines that the condition for performing the three-dimensional image mode is not satisfied when the received navigation information includes information of a steep curved road having a predetermined curvature or more within a predetermined distance.

The vehicle further includes an input to receive a maintenance command of the three-dimensional image mode, wherein the controller, when the maintenance command of the three-dimensional image mode is received through the input, determines whether the user's line of sight is recognized during execution of the three-dimensional image mode, stops position adjustment of the plurality of barriers and fixes the positions of the plurality of barriers when the user's line of sight is not recognized, and controls the display panel to output a three-dimensional image.

The vehicle further includes a detector to detect a rotation angle of the steering wheel, wherein the controller, when executing the two-dimensional image mode, controls to convert the two-dimensional image mode into the three-dimensional image mode when the detected rotation angle of the steering wheel is within a preset angle range.

The controller controls the cluster to display performance information of the two-dimensional image mode as a pop-up window when the condition for performing the three-dimensional image mode is not satisfied.

In accordance with another aspect of the present disclosure, a display device includes: a display panel to output a three-dimensional image; a barrier panel disposed adjacent the display panel and having a plurality of barriers; a communication device to receive an image from an image obtainer; and a controller configured to recognize a user's line of sight from the image received through the communication device, to adjust, when the user's line of sight is recognized from the image, positions of the plurality of barriers based on the recognized line of sight of the user, and to stop, when the user's line of sight is not recognized from the image, the position adjustment of the plurality of barriers and fix the positions of the plurality of barriers to the last position.

The display device further includes an input to receive a converting command of a two-dimensional image mode, wherein the controller, when the converting command of the two-dimensional image mode is received through the input, determines whether the user's line of sight is recognized during the execution of the three-dimensional image mode, controls the off of the barrier panel when the user's line of sight is not recognized, and controls the operation of the display panel to output a two-dimensional image.

The controller, when executing the two-dimensional image mode, controls the barrier panel to be turned off and controls the display panel to output a two-dimensional image.

The controller adjusts the positions of the plurality of barriers based on the recognized line of sight of the user during the execution of the three-dimensional image mode and stores adjustment values at the time of position adjustment of the plurality of barriers.

In accordance with another aspect of the present disclosure, a control method of a vehicle which has a cluster having a display panel and a barrier panel, includes steps of: determining, by a controller, whether a condition for performing a three-dimensional image mode is satisfied based on manipulation information of a steering wheel when a two-dimensional image converting command is received through an input; recognizing, by the controller, a user's line of sight based on an image of an image obtainer when the condition for performing the three-dimensional image mode is satisfied; controlling, by the controller, operations of the display panel and the barrier panel so that an image output mode of the cluster is performed as the three-dimensional image mode, based on the recognized line of sight of the user; and controlling, by the controller, when the condition for performing the three-dimensional image mode is not satisfied, operations of the display panel and the barrier panel so that the image output mode of the cluster is performed as a two-dimensional image mode.

The performing of the three-dimensional image mode includes adjusting the positions of a plurality of barriers of the barrier panel based on the recognized line of sight of the user and outputting a three-dimensional image through the display panel.

The performing of the two-dimensional image mode includes controlling the barrier panel to be turned off and outputting a two-dimensional image through the display panel.

The determining of whether the condition for performing the three-dimensional image mode is satisfied includes detecting a rotation angle of the steering wheel and determining that the condition for performing the three-dimensional image mode is satisfied when the detected rotation angle of the steering wheel is within a preset angle range.

The determining of whether the condition for performing the three-dimensional image mode is satisfied includes determining that the condition for performing the three-dimensional image mode is not satisfied when a turn-on command of a direction indicator is received through a lever.

The determining of whether the condition for performing the three-dimensional image mode is satisfied includes determining of whether navigation information received from a vehicle terminal includes change information of the driving direction within a predetermined distance, determining that the condition for performing the three-dimensional image mode is not satisfied when the received navigation information includes the change information of the driving direction within the predetermined distance, and determining that the condition for performing the three-dimensional image mode is not satisfied when the received navigation information includes information of a curved road having a predetermined curvature or more within a predetermined distance.

The control method further includes: determining, when a maintenance command of the three-dimensional image mode is received through the input, whether a user's line of sight is recognized based on manipulation information of the steering wheel during execution of the three-dimensional image mode, stopping position adjustment of a plurality of barriers and fixing the positions of the plurality of barriers when the user's line of sight is not recognized, and outputting a three-dimensional image through the display panel.

The determining of whether or not the user's line of sight is recognized includes detecting a rotation angle of the steering wheel, and determining that the user's line of sight is not recognized when the detected rotation angle of the steering wheel deviates from a preset angle range, and the control method further includes predicting that the user's line of sight is not to be recognized when a turn-on command of a direction indicator is received through a lever, and predicting that the user's line of sight is not to be recognized when navigation information received from a vehicle terminal includes change information of the driving direction within a predetermined distance.

The control method further includes: displaying performance information of the two-dimensional image mode as a pop-up window when executing the two-dimensional image mode; detecting a rotation angle of the steering wheel; and controlling to convert the two-dimensional image mode into the three-dimensional image mode when the detected rotation angle of the steering wheel is within a preset angle range.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
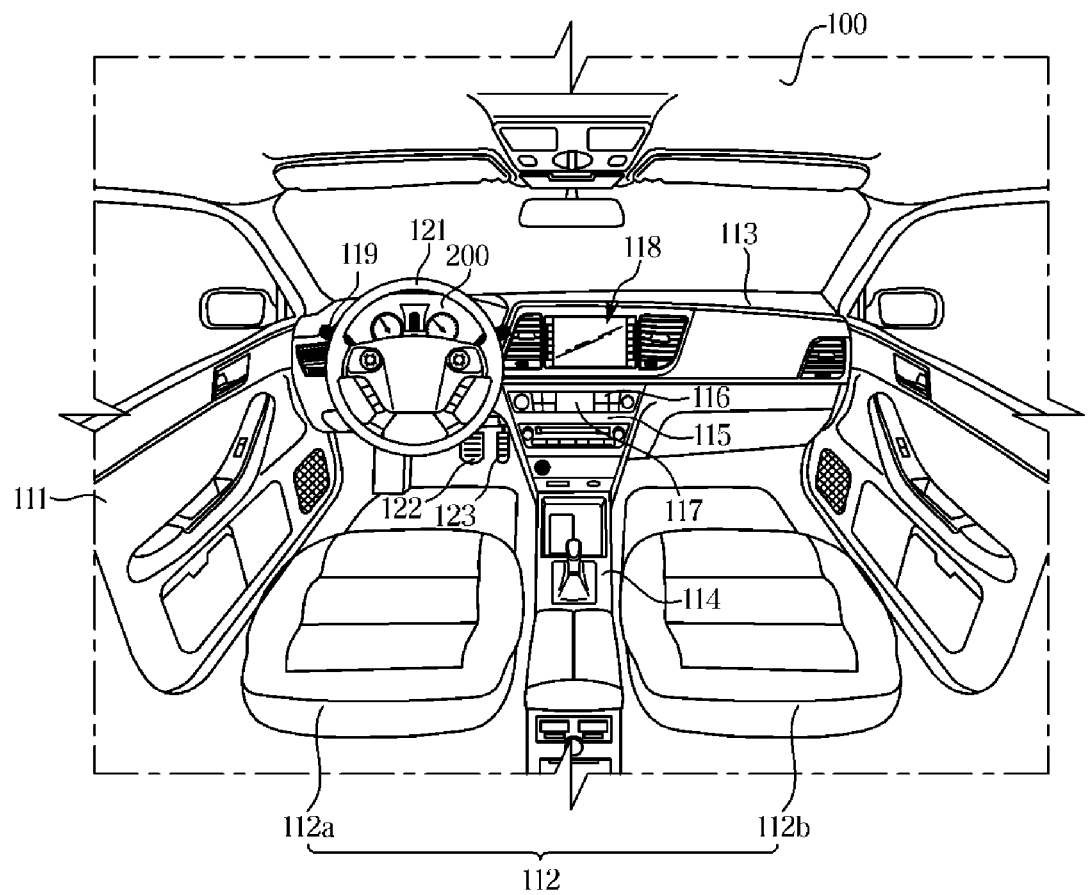
FIG. 1 is an exemplary view of a vehicle according to an exemplary embodiment of the present disclosure.

Like reference numerals refer to like components throughout this specification. This specification does not describe all components of embodiments, and general information in the technical field to which the present disclosure belongs or overlapping information between the embodiments will not be described. The terms "portion," "module," "member," and "block" as used herein, may be implemented as software or hardware, and according to embodiments, a plurality of "portions," "modules," "members," or "blocks" may be implemented as a single component, or a single "portion," "module," "member," or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

It will be understood that the terms "includes," "comprises," "including," and/or "comprising," when used in this specification, specify the presence of a stated component, but do not preclude the presence or addition of one or more other components.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations may be executed in a different order from the stated order unless a specific order is definitely specified in the context.

Hereinafter, the operation principle and embodiments of the present disclosure will be described with reference to the accompanying drawings.

FIG. 1 is an exemplary view of a vehicle body of a vehicle according to an exemplary embodiment of the present disclosure.

A vehicle 100 includes a vehicle body having an exterior and interior, and a chassis which is the rest of the vehicle 100 except for the vehicle body and on which machinery necessary for driving is installed.

As shown in FIG. 1, the exterior of the vehicle body includes a front panel, a bonnet, a roof panel, a rear panel, front, rear, right and left doors 111, and window glasses provided in the front, rear, right and left doors 111 so as to be opened and closed.

The exterior of the vehicle body further includes side mirrors that provide a driver with a field of view behind the vehicle 100, and lamps that allow the driver to easily recognize the surroundings while observing the front view and perform the functions of signaling and communication with other vehicles and pedestrians.

The interior of the vehicle body includes a seat 112 on which an occupant sits, a dashboard 113, a center fascia 114 in which ventilation holes and throttle plates of an air conditioner are disposed, and a head unit 115 provided in the center fascia 114 and receiving an operation command of audio equipment and the air conditioner.

The seat 112 may include a driver's seat 112a on which the driver sits and a passenger seat 112b on which a passenger sits.

The vehicle 100 may further include an input 116 for receiving operation information on various functions.

The input 116 may be provided in the head unit 115 and the center fascia 114, and may include at least one physical button such as an operation-on-off button for various functions, a button for changing setting values of the various functions, and the like.

The input 116 may further include a jog dial (not shown) or a touch pad (not shown) for inputting a movement command and a selection command of a cursor displayed on a vehicle terminal 118. Herein, the jog dial or the touch pad may be provided at the center fascia 114 or the like.

The input 116 may receive an image output mode of a cluster. Herein, the image output mode may include a three-dimensional image mode and a two-dimensional image mode.

The input 116 may receive an image output command of the cluster when a line of sight is not recognized. The image output command at this time may include a maintenance command of the three-dimensional image mode or a converting command of the two-dimensional image mode.

That is, when the line of sight is not detected, the input 116 may receive the maintenance command of the three-dimensional image mode to output a three-dimensional image through the cluster and the converting command of the two-dimensional image mode to output a two-dimensional image through the cluster.

The input 116 may receive a navigation mode execution command and receive destination information when performing the navigation mode.

The vehicle 100 may further include a display 117 which is provided in the head unit 115 and displays information about a function that is performing in the vehicle 100 and information input by a user.

The vehicle 100 further includes the vehicle terminal 118 for user convenience. The vehicle terminal 118 may be installed on the dashboard 113 in a built-in or stationary manner.

The vehicle terminal 118 may be implemented as a touch screen integrated with a touch panel on a display panel, or may be implemented as only a display panel.

The vehicle terminal 118 outputs images about audio function, video function, navigation function, broadcasting function (DMB function), and radio function.

The vehicle 100 further includes a lever 119 for selecting on/off of indicators such as a headlamp indicator, a direction indicator, a fog lamp indicator, and a tail lamp indicator. Herein, the lever 119 is also referred to as a lamp lever or a left lever.

The vehicle 100 further includes a shift lever provided on the center fascia 114 and receiving an operation position, and a parking button (EPB button) located around the shift lever or on the head unit 115 and receiving an operation command of an electronic parking brake device (not shown).

Front, rear, left and right wheels, a power unit for applying a driving force to the front, rear, left and right wheels, a steering device, a braking device for applying braking force to the front, rear, left and right wheels, and a suspension device may be provided on a vehicle frame for supporting the vehicle body.

The power unit is an apparatus for generating a driving force necessary for running the vehicle 100 and regulating the generated driving force, and may include a power generating device and a power transmitting device.

The power generating device may include at least one of an engine, a fuel device, a cooling device, a fuel supply device, a battery, a motor, a starter (or a generator), and a power converter.

The power transmitting device may include at least one of a clutch, a transmission, a final reduction device, a differential device, and an axle.

The vehicle 100 may further include a steering wheel 121 of the steering device for adjusting a traveling direction, a brake pedal 122 that is pressed by the user in accordance with the braking will of the user, and an accelerator pedal 123 that is pressed by the user in accordance with the acceleration will of the user.

The vehicle 100 may further include a cluster 200 disposed on the dashboard 113 and displaying driving information and state information of the vehicle 100.

The cluster 200 of the present embodiment may be implemented as a display device.

Figure 2:
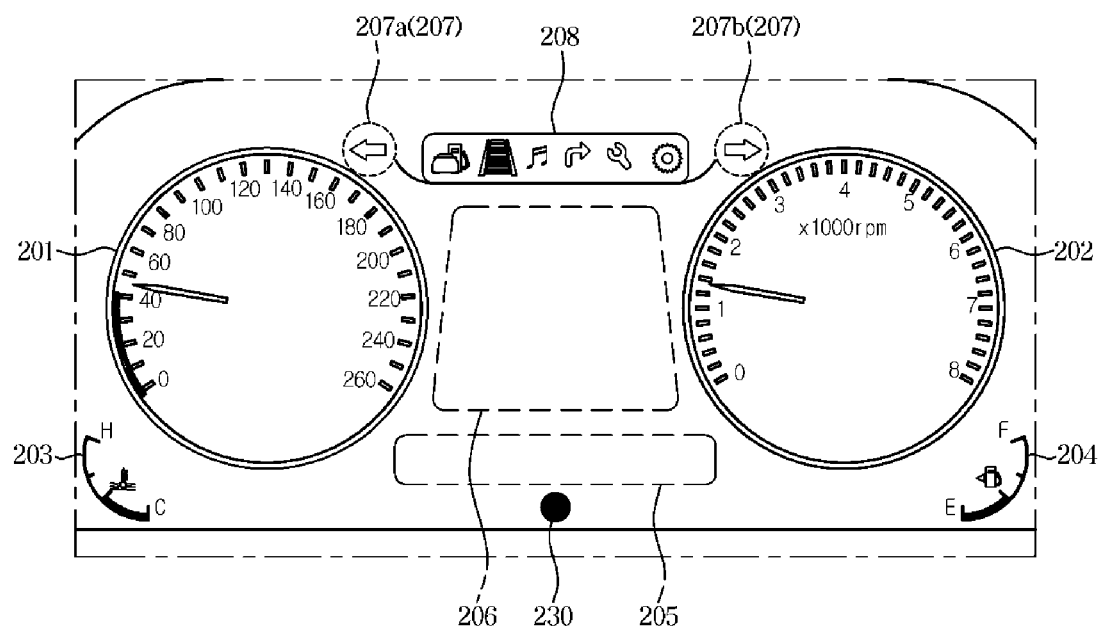
FIG. 2 is an exemplary view of a cluster provided in a vehicle according to an exemplary embodiment of the present disclosure.

Referring to FIG. 2, the cluster 200, which is a display device, displays a tachometer image 201 corresponding to a tachometer, a speedometer image 202 corresponding to a speedometer, a cooling water thermometer image 203 corresponding to a cooling water thermometer, and a fuel gauge image 204 corresponding to a fuel gauge in a dial fashion.

The cluster 200 displays warning light symbols corresponding to a battery warning light, an engine oil warning light, a fuel shortage warning light, and a safety belt warning light, respectively, in a warning light notification area 205.

The cluster 200 may selectively display various images corresponding to an odometer, a trochometer, mileage, external temperature, internal temperature, a stage of the shift lever, and a travelable distance in a trip area 206.

The cluster 200 may display various images corresponding to the odometer, the trochometer, the mileage, the external temperature, the internal temperature, the stage of the shift lever, and the travelable distance in the trip area 206 as characters.

The cluster 200 may further display door opening information, surrounding obstacle information, and air pressure abnormality information of a tire in the trip area 206.

The cluster 200 may display images of door openings, obstacle positions, and tire air pressure abnormality in a manner matching a simplified shape image of the vehicle. For example, the cluster 200 may display an open door in the shape image of the vehicle, display an area where an obstacle exists in the periphery of the shape image of the vehicle, or display a wheel having abnormal air pressure in the shape image of the vehicle.

The cluster 200 may further display on/off information of the head lamp, the tail lamp, the fog lamp, and the like.

The cluster 200 may further display indication light symbols corresponding to the indication light of the direction indicator, the indication light of the head lamp indicator, the indication light of the fog lamp indicator, and the indication light of the tail lamp indicator, respectively.

The cluster 200 may display indication light images 207 of the direction indicators corresponding to direction indication information as an image of an arrow symbol.

The indication light images 207 of the direction indicators may include a left turn indication light image 207a indicated by a left direction arrow symbol and a right turn indication light image 207b indicated by a right direction arrow symbol.

The cluster 200 may display various images corresponding to additional functions that are performed in the vehicle 100 and a display setting function of the cluster 200 in an additional area 208 as symbols.

The positions of images and the symbols of images corresponding to various kinds of information displayed on the cluster 200 may be changed.

The cluster 200 displays a rotational speed of the engine as the number of revolutions per minute in a dial fashion, a traveling speed of the vehicle 100 as kilometers or miles per hour in a dial fashion, a temperature of the engine cooling water in a dial fashion, and the amount of fuel remaining in a fuel tank in a dial fashion.

The cluster 200 may display the total mileage in kilometers or miles after the vehicle leaves the factory and may display the mileage in kilometers or miles for a period of time.

The cluster 200 displays the indication light symbol of an up light indicator when the up light indicator is turned on, displays an indication light symbol of a left turn indicator when the left turn indicator is turned on, and displays an indication light symbol of a right turn indicator when the right turn indicator is turned on.

The cluster 200 displays a battery warning light symbol when the charged amount of the battery is less than a reference charged amount, displays an engine oil warning light symbol when the amount of engine oil is less than a reference engine oil amount, displays a safety belt warning light symbol when the passenger is traveling without wearing a safety belt, and displays a door open warning light symbol when a door is opened.

The cluster 200 may display the running information of the vehicle 100 and the state information of the vehicle 100 as a two-dimensional image or a three-dimensional image. An image obtainer 230 may be provided in an inner region or a periphery of the cluster 200.

Figure 3:
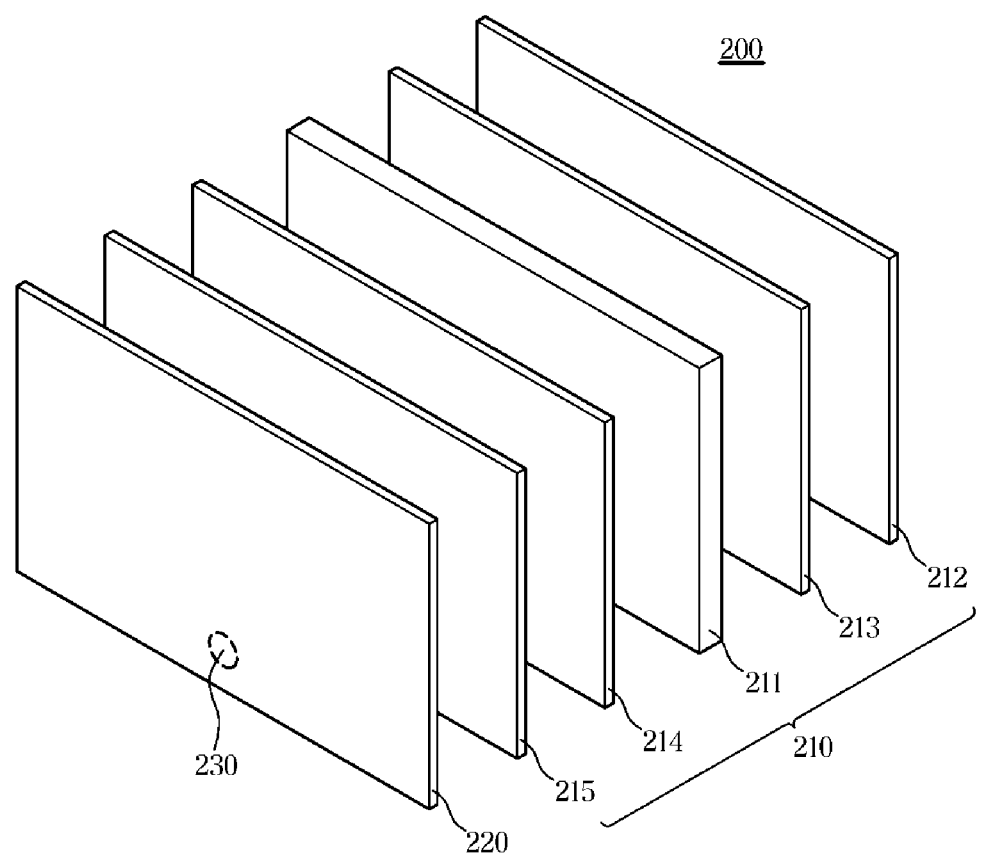
FIG. 3 is a configuration view of a cluster provided in a vehicle according to an exemplary embodiment of the present disclosure.

FIG. 3 is a configuration view of a cluster provided in a vehicle according to an exemplary embodiment of the present disclosure, which will be described with reference to FIGS. 4A and 4B. In this embodiment, the cluster is implemented as a display device, and hereinafter, the cluster is described as a display device.

The display device 200 includes a display panel 210 for displaying images such as characters and figures, and a barrier panel 220 for displaying an image displayed on the display panel 210 as a two-dimensional image or a three-dimensional image.

The display panel 210 is a non-light emitting type display panel, and may include any one of a liquid crystal display panel (LCD), an organic electroluminescence display panel (ELD), a field emission display panel (FED), and a thin film transistor liquid crystal display (TFT-LCD).

In this embodiment, the liquid crystal display panel will be described as an example of the display panel 210.

As shown in FIG. 3, the display panel 210 of the display device 200 includes a liquid crystal panel 211 for converting electrical information into image information by using a change in liquid crystal transmittance according to an applied voltage.

The display device 200 also includes a backlight unit 212 disposed on the back surface of the liquid crystal panel 211 and spaced apart from the liquid crystal panel 211 by a predetermined distance and emitting light toward the liquid crystal panel 211, a first polarizing panel 213 disposed between the liquid crystal panel 211 and the backlight unit 212 to polarize the unpolarized light transmitted from the backlight unit 212 in a first direction or a second direction, and a second polarizing panel 214 disposed on the front surface of the liquid crystal panel 211 to polarize the image light output from the liquid crystal panel 211 in one direction.

The display device 200 may further include a transparent protection panel 215 disposed on the front surface of the second polarizing panel 214. The transparent protection panel 215 may be disposed on the front surface of the barrier panel 220.

The liquid crystal panel 211 displays a two-dimensional image or a three-dimensional image using the light emitted from the backlight unit 212.

The liquid crystal panel 211 includes a thin film transistor (hereinafter referred to as "TFT") array substrate, a color filter array substrate disposed facing the TFT array substrate, and a liquid crystal layer provided between the TFT array substrate and the color filter array substrate.

The TFT array substrate includes intersecting data lines and gate lines (or scan lines), a thin film transistor formed at every intersection of the gate lines and the data lines, pixel electrodes defined in a matrix form by data lines and gate lines, a storage capacitor (Cst) for maintaining the voltage of the liquid crystal cells of the liquid crystal layer, and the like.

The color filter array substrate includes a black matrix corresponding to the boundary of pixel regions, color filters made up of red, green, and blue color patterns sequentially corresponding to the respective pixel regions, a common electrode (not shown), and the like.

Herein, the common electrode is formed on the color filter array substrate in the vertical electric field driving method such as TN (Twisted Nematic) mode and VA (Vertical Alignment) mode, and is formed on the TFT array substrate together with the pixel electrodes in the horizontal electric field driving method such as IPS (In Plane Switching) mode and FFS (Fringe Field Switching) mode.

The driving of the liquid crystal panel, which is the display panel 210, will be briefly described below.

When the image signals to be displayed on the liquid crystal panel (i.e., data signals) are respectively inputted to the data lines, the data signals are transmitted to the pixel electrodes in response to the scan pulse of the gate lines of the TFTs.

When the data signals are applied to the pixel electrodes, an electric field is formed between each pixel electrode and the common electrode disposed on the color filter array substrate side, that is, in the liquid crystal cells, the liquid crystal arrangement of the liquid crystal cells is changed by the electric field, and the amount of light passing through each color filter of the color filter array substrate changes due to the change of the liquid crystal arrangement of the plurality of liquid crystal cells.

That is, a plurality of pixels may be represented by different colors depending on the amount of light passing through each color filter of the color filter array substrate, and an image is formed through the color combination of the pixels.

That is, since the liquid crystal panel 211 cannot emit light from the liquid crystal itself, the amount of light emitted from the backlight unit 212 is controlled, and the amount of light passing through the color filters is controlled by the amount of transmission so that an image can be seen.

The liquid crystal panel 211 displays a two-dimensional image in a two-dimensional mode and displays a three-dimensional image in a three-dimensional mode.

The polarization axes of the first polarizing panel 213 and the second polarizing panel 214 may be orthogonal to each other.

The transparent protection panel 215 may be a polymer film or a substrate made of a glass plate, polycarbonate, polyethylene terephthalate, polyacryl, or the like.

The backlight unit 212 may be an edge type backlight unit in which a light source is disposed on at least one side surface of the light guide plate, and may be a direct-type backlight unit in which a light source is disposed on the rear surface of the light guide plate.

The light source may include a plurality of light emitting diodes (LEDs).

The light guide plate may be made of a plastic material such as polymethylmethacrylate (PMMA) which is an acrylic transparent resin, which is one of transparent materials capable of transmitting light, or may be made of a flat type by a polycarbonate (PC) series.

Such light guide plate is excellent in transparency, weatherability, and colorability, and thus induces light diffusion when transmitting light.

The display panel 210 may output a disparity image (i.e., a three-dimensional image) or a two-dimensional image corresponding to the parallax barrier of the barrier panel 220. Herein, the disparity image is a combination of a left eye (L) image and a right eye (R) image.

The barrier panel 220 may be disposed on the front surface of the display panel 210. In addition, the barrier panel 220 may be disposed between the liquid crystal panel 211 and the backlight unit 212 of the display panel 210.

The barrier panel 220 guides the light of the image output through the display panel 210 in the OFF operation state to one direction.

The barrier panel 220 guides the light of the image output through the display panel 210 in the ON operation state to a first view direction and a second view direction. That is, when the light of the image is incident on the barrier panel 220 in the three-dimensional mode, the barrier panel 220 guides the light to a first optical path and guides the light to a second optical path. Herein, the first optical path may be the optical path of the left eye image, and the second optical path may be the optical path of the right eye image.

The barrier panel 220 will be described in more detail below.

The barrier panel 220 implements a parallax barrier using a plurality of barriers 220a. That is, when a disparity image is output from the display panel 210, the barrier panel 220 may output a parallax barrier three-dimensional image through the display device.

That is, due to the parallax barrier, the disparity image shows only the left eye (L) image in the left eye of the user and only the right eye (R) image in the right eye of the user. This allows the user to view three-dimensional (3D) images having a stereoscopic effect.

The barrier panel 220 may adjust a barrier offset of a parallax barrier three-dimensional image when a three-dimensional image is output through the display panel 210. In addition, the barrier panel 220 may further adjust the depth level.

Herein, the barrier offset may indicate an interval between a point where a disparity image appearing on the display panel 210 starts and a point where a parallax barrier appearing on the barrier panel 220 starts. This barrier offset is also referred to as tolerance.

The barrier offset may also be related to the line of sight of the user.

That is, since the user's sight line position, parallax barrier, and disparity image must be arranged so as to correspond to each other in order for the user who views a three-dimensional image to feel the stereoscopic effect, at least one of the parallax barrier and disparity image placement must be changed depending on the position of the line of sight. As such, since the line of sight of the user varies, the barrier offset corresponding to the line of sight of the user may also be varied.

The barrier panel 220 may be implemented as a liquid crystal. The barrier panel 220 may change the positions of a slit section and block sections of the barrier formed on the barrier panel 220 by alternately applying an AC voltage to a pair of transparent electrodes (ITO; not shown) which are different from each other to change the transmission amount of the liquid crystal. The barrier panel 220 may be a switchable parallax barrier panel in which the slit section and the block sections are variable.

The barrier formed on the barrier panel 220 may be a stripe type barrier configured in the form of stripes in a vertical direction. When the barrier of the barrier panel 220 is a stripe barrier type, the plurality of barriers 220a included in the barrier panel 220 may be in the form of long bars in the vertical direction, and the plurality of barriers 220a may be in a horizontally arranged form.

The plurality of barriers of the barrier panel 220 may be in the form of a thin rod.

Figure 6:
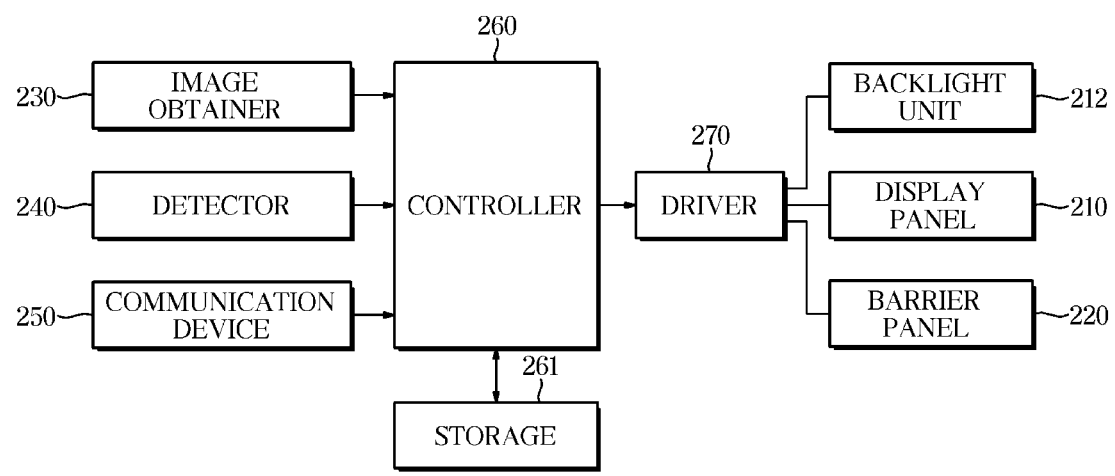
FIG. 6 is a control configuration diagram of a vehicle according to an exemplary embodiment of the present disclosure.

The plurality of barriers 220a included in the barrier panel 220 may be individually transparent or opaque according to a control signal of a controller 260 (refer to FIG. 6).

Figure 4A:
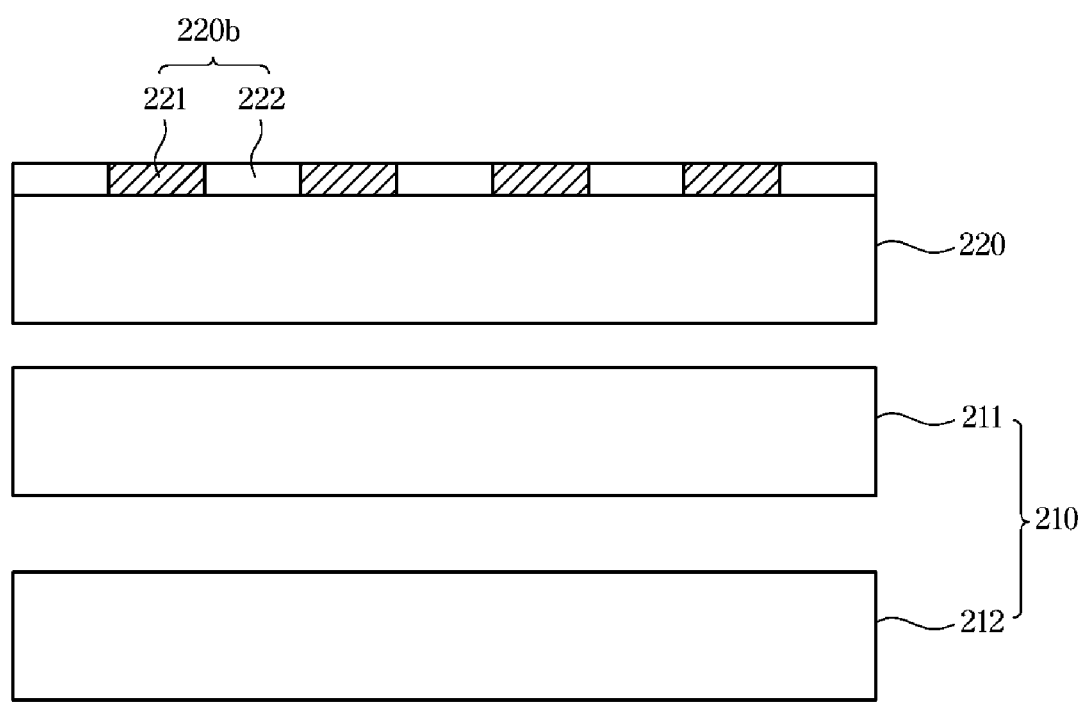
FIGS. 4A and 4B are exemplary operation views of a barrier panel of a cluster provided in a vehicle according to an exemplary embodiment of the present disclosure.

As shown in FIG. 4A, when all the barriers of the barrier panel 220 are in a transparent state, the display device 200 may display a two-dimensional image. At this time, the display panel 210 may output the two-dimensional image.

Figure 4B:
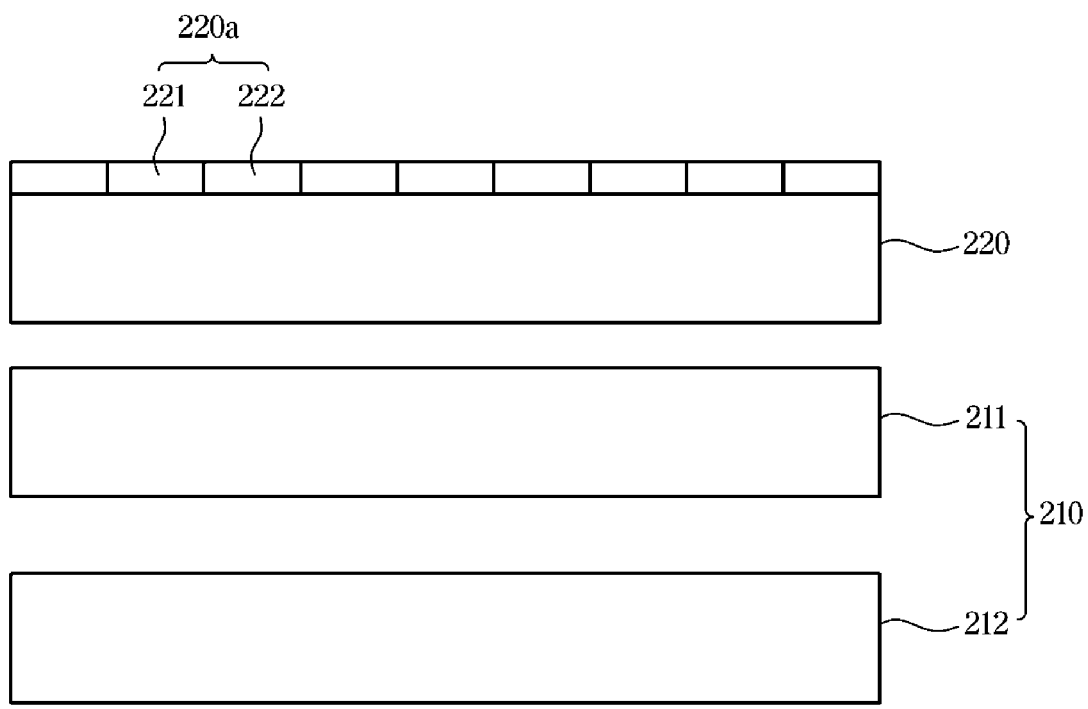

As shown in FIG. 4B, when the plurality of barriers of the barrier panel 220 is alternately in a transparent state and opaque state, the display panel 210 may display a three-dimensional image. At this time, the display panel 210 may output the three-dimensional image.

Sections in which the barriers of the barrier panel 220 are in an opaque state are referred to as block sections 221 and sections in which the barriers of the barrier panel 220 are in a transparent state are referred to as slit sections 222.

The block sections 221 may be opaque sections through which light cannot pass, and block light of an image displayed on the display panel 210. Here, the user cannot see the image through the block sections 221.

The slit section 222 is a transparent section through which light may pass, and passes light of an image displayed on the display panel 210. Here, the user may view the image displayed on the display panel 210 through the slit section 222.

That is, the barrier panel 220 may implement a parallax barrier using at least one block section and at least one slit section. Such parallax barrier may cause a binocular parallax of the user viewing an image appearing on the display panel 210. Herein, the binocular parallax means that the part viewed through the left eye of the user is different from the part viewed through the right eye of the user.

Since the barrier panel 220 is spaced apart from the display panel 210 at a certain distance, when the user views an image appearing on the display panel 210 through the parallax barrier, the binocular parallax may occur.

In the right eye of the user, the right eye image is seen through the slit section of the parallax barrier. Due to the block sections of the parallax barrier, the left eye image is not seen in the right eye of the user.

In the left eye of the user, the left eye image is seen through the slit section of the parallax barrier. Due to the block sections of the parallax barrier, the right eye image is not seen in the left eye of the user.

That is, due to the parallax barrier, the user views only the left eye image in the left eye and only the right eye image in the right eye. In this case, the user may feel the stereoscopic effect through the parallax barrier 3D image displayed on the display device 200.

The display device 200 may include the image obtainer 230 for acquiring an image of the user to recognize the line of sight of the user (refer to FIGS. 1 and 3).

The image obtainer 230 may be provided on the periphery of the display device 200 or on the dashboard around the display device 200.

The image obtainer 230 acquires the face image of the user but may fail to acquire the face image of the user depending on the operation state of the steering wheel 121.

Figure 5A:
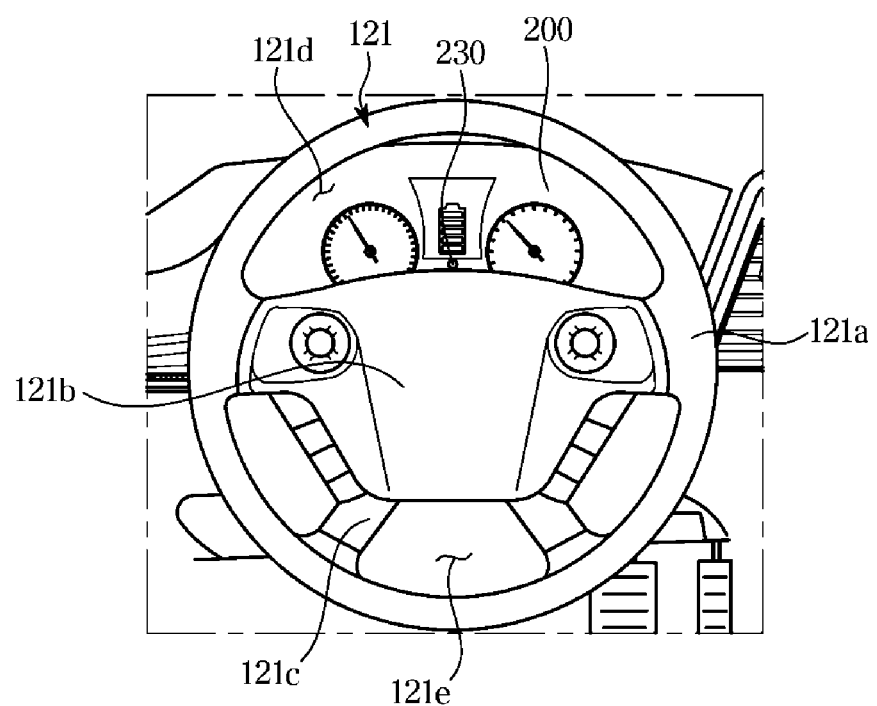
FIGS. 5A, 5B and 5C are exemplary exposure views of an image obtainer corresponding to an operating state of a steering wheel provided in a vehicle according to an exemplary embodiment of the present disclosure.

The steering wheel 121 is a device for adjusting the driving direction of the vehicle 100, and may include a circular rim 121a provided at the outer periphery of the steering wheel 121 and gripped by the user's hand, and a spoke that is connected to the chassis of the vehicle 100 and couples the hub of a rotary shaft (i.e., a steering shaft) for steering with the rim 121a (see FIG. 5A)

The steering wheel 121 further includes a boss 121b disposed at the center of the rim 121a, at least one spider 121c connecting the rim 121a and the boss 121b, and a plurality of holes 121d and 121e formed between the rim 121a and the boss 121b. The hole 121e of the plurality of holes 121d and 121e may be divided by the at least one spider 121c.

That is, a plurality of holes or one hole may be formed in the steering wheel 121.

As shown in FIG. 5A, the cluster 200, which is a display device, may be recognized by the user through at least one of the holes 121d and 121e formed in the steering wheel 121. That is, the image obtainer 230 provided in the display device 200 may acquire the user's face image through at least one of the holes 121d and 121e formed in the steering wheel 121.

Figure 5B:
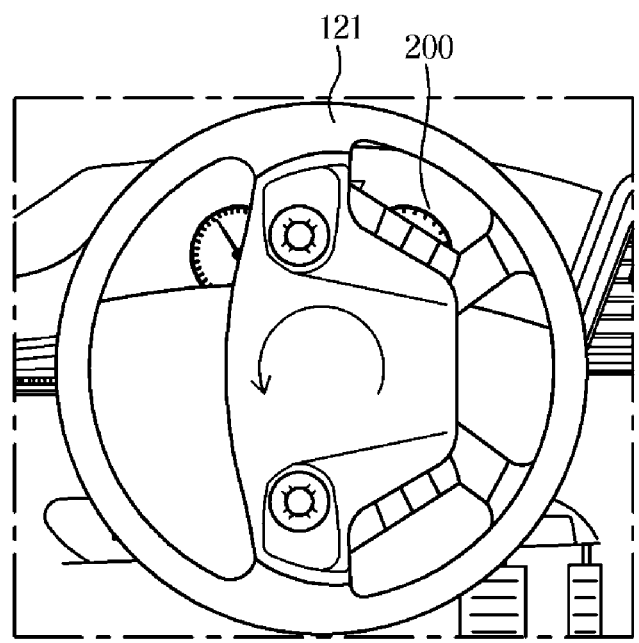
Figure 5C:
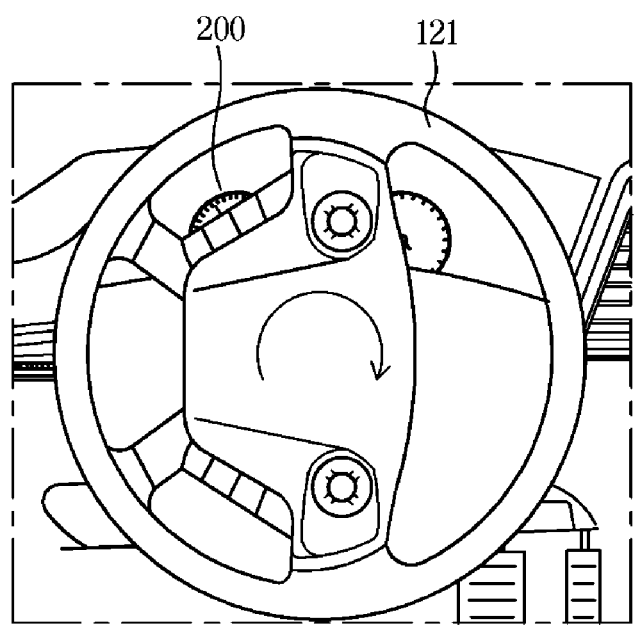

When the steering wheel 121 is rotated in the left direction by a predetermined angle or more as shown in FIG. 5B, or when the steering wheel 121 is rotated in the right direction by a predetermined angle or more as shown in FIG. 5C, the view of the image obtainer 230 is blocked by the boss 121b or the spider 121c of the steering wheel 121 and the user's face image cannot be acquired.

That is, the boss 121b and the spider 121c of the steering wheel 121 may act as an obstacle to image acquisition by the image obtainer 230.

The display device 200 of the present embodiment has been described with respect to the cluster provided on the dashboard of the vehicle 100. However, the display device 200 may be implemented as a display of a mobile device such as a smart phone, a tablet, and a notebook or as a display of a television.

In addition, the display device 200 of the present embodiment may be implemented as a monitor of a PC, or may be implemented as a guide indicator at a bus stop, a subway station, or a department store.

FIG. 6 is a control configuration diagram of a vehicle for controlling a cluster implemented as a display device.

The vehicle 100 includes the image obtainer 230, a detector 240, a communication device 250, the controller 260, a storage 261, and a driver 270.

The image obtainer 230 acquires images of the surroundings of the cluster 200 and images of the surroundings of the steering wheel 121 among indoor images of the vehicle 100 in order to acquire the user's face image.

The image obtainer 230, which is a camera, may include a CCD or a CMOS image sensor. The image obtainer 230 may further include an infrared camera and a dot projector.

The detector 240 detects a manipulation state of the steering wheel 121.

The detector 240 may include an angle detector that detects a rotation angle of the steering wheel 121, and may include an angular velocity detector that detects an angular velocity of the steering wheel 121 for detecting a steering angle of the vehicle 100.

The detector 240 may also detect an operating state of the lever 119 to predict an operating state of the steering wheel 121.

The detector 240 may detect a turn-on signal of the left turn indicator by the operation of the lever 119 and a turn-on signal of the right turn indicator by the operation of the lever 119.

The communication device 250 communicates with the vehicle terminal 118 to receive navigation information from the vehicle terminal 118, and may transmit the received navigation information to the controller 260.

The navigation information may include left turn information, right turn information, distance information to the left turn point, and distance information to the right turn point.

Further, the navigation information may further include information on a right steep curved road and a left steep curved road.

The communication device 250 may include a GPS (Global Positioning System) receiver that communicates with a plurality of satellites, and a signal processor that acquires the current position using distance and time information corresponding to the position signals of the plurality of GPS satellites and outputs the obtained position data of the vehicle.

The communication device 250 communicates with a plurality of sensors (not shown) provided in the vehicle, and receives driving information and state information of the vehicle from the plurality of sensors.

The driving information of the vehicle 100 may include information such as the rotational speed of the engine, the driving speed, the driving distance, and the driving record.

The state information of the vehicle 100 may include information such as door opening and closing, fuel amount, safety belt wearing state, internal temperature, external temperature, fuel shortage, cooling water temperature, battery discharge and the like.

Examples of sensors provided in the vehicle are described below.

The vehicle 100 may include an inclination sensor for sensing the inclination of a road, a weight detection sensor for sensing the weight of the vehicle, a yaw sensor for sensing the yaw rate of the vehicle, a gyro sensor for sensing the angular velocity in the 6-axis direction, an accelerator pedal position sensor, a brake pedal position sensor, an air flow sensor (AFS), an intake air temperature sensor (ATS), a water temperature sensor (WTS), a throttle position sensor (TPS), a TDC sensor, a crank angle sensor (CAS), and the like.

Examples of sensors associated with information displayed on the cluster among the sensors provided in the vehicle are described below.

The vehicle 100 may include at least one of an engine speed sensor for sensing the rotational speed of the engine, a collision sensor for sensing a collision with an obstacle, a wheel sensor for sensing the rotational speed of the wheel, a speed sensor for sensing the driving speed of the vehicle, a battery sensor for sensing the amount of charge of the battery, a fuel sensor for sensing the amount of fuel in the fuel tank, tire sensors for sensing air pressure of a plurality of tires, an internal temperature sensor for sensing the internal temperature of the vehicle, an internal humidity sensor for sensing the internal humidity of the vehicle, an illumination sensor for sensing external illumination, and an obstacle sensor for sensing obstacles around the vehicle.

The obstacle sensor may include at least one of a camera module, a radar, a lidar, and an ultrasonic sensor.

The camera module acquires an image of the outside of the vehicle, and may include an AVM (Around View Monitoring) device, a BSD (Blind Spot Detection) device, or a rear camera device. The AVM device may synthesize a plurality of images obtained from a plurality of cameras and provide a vehicle peripheral image to the user.

The AVM device may synthesize a plurality of images and convert the synthesized image into an image that is convenient for the user to view so that the image may be displayed. For example, the AVM device may synthesize a plurality of images and convert the synthesized image into a top-view image so that the image may be displayed.

The controller 260 may receive various kinds of information sensed by a plurality of sensors through the communication device 250.

For example, the controller 260 may acquire collision information, obstacle proximity information, driving direction information, driving speed information, engine rotation speed information, acceleration information, battery charge amount information, fuel amount information, cooling water temperature information, tire air pressure information, indicator on-off information, vehicle internal temperature information, vehicle internal humidity information, external illumination information, pressure information applied to the accelerator pedal, pressure information applied to the brake pedal, safety belt wearing information, door opening/closing information, and the like from the plurality of sensors.

The controller 260 acquires driving information and state information of the vehicle 100 based on various kinds of information received through the communication device 250, and controls the operation of the cluster 200 to display the acquired driving information and state information of the vehicle.

More specifically, the controller 260 controls the operation of the cluster 200 to display driving speed information, engine rotational speed information, cooling water temperature information, and fuel amount information in a dial fashion based on various kinds of information received through the communication device 250.

The controller 260 also acquires the driving distance based on the wheel speed, and controls the operation of the cluster 200 to display the acquired driving distance value and the driving record value, which is an accumulated value of the driving distance, as characters.

The controller 260 also identifies the indicators that are turned on based on various kinds of information received through the communication device 250 and controls the operation of the cluster 200 to display symbols corresponding to the identified indicators.

The controller 260 also recognizes warning information based on various kinds of information received through the communication device 250 and controls the operation of the cluster 200 to display the recognized warning information as a symbol.

The controller 260 may also control the operation of the cluster 200 to display information about a function that is performing in the vehicle 100 as a symbol, and may also control the operation of the cluster 200 to display a setting icon for a function that may be set by the user.

The controller 260 may change the information displayed on the trip area 206 of the cluster 200. That is, the controller 260 may control the cluster 200 to display the fuel consumption, mileage value, and driving record value as basic information on the trip area 206, and may control the cluster 200 to convert the image displayed on the trip area 206 into the image corresponding to notification information when the notification information is received during the display of the basic information and display the converted image.

For example, the controller 260 may control the cluster 200 to convert the image corresponding to the basic information displayed on the trip area 206 into a door open image when the door open information is received and display the door open image, may control the cluster 200 to convert the image corresponding to the basic information displayed on the trip area 206 into an obstacle proximity image when the obstacle proximity information is received and display the obstacle proximity image, and may control the cluster 200 to convert the image corresponding to the basic information displayed on the trip area 206 into a tire air pressure image when the tire air pressure abnormality signal is received and display the tire air pressure image.

The controller 260 may receive an image in the visual field of the image obtainer 230.

The controller 260 acquires the face image of the user from the image acquired by the image obtainer 230, and recognizes a line of sight of the user on the acquired face image.

More specifically, the controller 260 may extract a face region using the edge information and the color information of the acquired image, extract feature points from the face region, recognize the user's eyes based on the extracted feature points, and recognize the pupils of the recognized eyes.

The feature points may include feature points such as eyes, nose, mouth, and the like, and may include intervals formed by points at specific positions extracted from the user's face image. For example, the feature points may be the distance between the pupils of the user's eyes, the distance between the nose tip and each pupil, the distance between the lip center and nose tip, and the like. These feature points may be used to determine whether the driver is the user of the vehicle.

The controller 260 may include determining whether the user in the driver's seat is a registered user based on the recognized face and controlling the driving of the vehicle when it is determined that the user in the driver's seat is the registered user.

The controller 260 may recognize the user's line of sight based on the image of the user's face and pupils and determine where the user's line of sight is headed based on the recognized line of sight. That is, the controller 260 may recognize the positions of the user's pupils and the change in the positions of the pupils.

The controller 260 may acquire information on the viewing distance of the user from the acquired image. At this time, the controller 260 may adjust the depth level based on the viewing distance.

Herein, the depth level is the degree of the stereoscopic effect appearing on a 3D image, and the larger the depth level, the greater the stereoscopic effect the user feels through the parallax barrier 3D.

The controller 260 may adjust the positions of the plurality of barriers of the barrier panel 220 so that a three-dimensional image is displayed corresponding to the user's line of sight, and may control the display panel 210 to output the three-dimensional image. Herein, the position adjustment value when adjusting the positions of the plurality of barriers is referred to as a barrier offset.

That is, the controller 260 may adjust the barrier offset by moving the parallax barrier due to the movement of the plurality of barriers implemented in the barrier panel 220.

When the viewing position of the user is the center, the barrier offset may be zero.

That is, the controller 260 controls the barrier panel 220 to be turned on when the user's face is recognized through the image obtainer 230, adjusts the positions of the plurality of barriers of the barrier panel 220 based on the position of the user's line of sight, and controls the operation of the display panel 210 to output a three-dimensional image.

Herein, the turn-on controlling of the barrier panel 220 includes forming some sections of the plurality of barriers of the barrier panel 220 to be opaque block sections and the other sections of the plurality of barriers of the barrier panel 220 to be slit sections. In this case, the block sections and the slit sections may be formed alternately.

The barrier panel 220 may implement a parallax barrier by the block sections and the slit sections.

The parallax barrier implemented in the barrier panel 220 and a three-dimensional image on the display panel 210 corresponding to the parallax barrier may be arranged to correspond to the position of the user's line of sight. In this case, the user may feel the stereoscopic effect from the image displayed through the cluster 200.

When it is determined that the user's face is not recognized through the image obtainer 230, the controller 260 controls the operation of the cluster 200 to convert the three-dimensional image displayed through the cluster 200 into a two-dimensional image and display the dimensional image.

The controller 260 controls the barrier panel 220 to be turned off when displaying the two-dimensional image through the cluster 200, and controls the display panel 210 to output the two-dimensional image.

Herein, the turn-off controlling of the barrier panel 220 includes controlling all of the plurality of barriers of the barrier panel 220 to form the slit section through which light passes. Accordingly, the barrier panel 220 may be entirely transparent.

The controller 260 may control the barrier panel 220 to be turned off when displaying a two-dimensional image through the cluster 200, and may control the display panel 210 to display the left eye image or the right eye image among three-dimensional images.

The controller 260 may adjust the barrier offset by moving the disparity image, which is a three-dimensional image output to the display panel 210.

The controller 260 controls the operation of the cluster 200 so that the performance information of the two-dimensional image mode is displayed as a pop-up window when executing the two-dimensional image mode. Herein, the pop-up image may be displayed for a preset time, and may be displayed continuously while the two-dimensional image mode is being performed.

The controller 260 confirms the detected rotation angle of the steering wheel 121 when executing the two-dimensional image mode, and controls to be converted into the three-dimensional image mode when the detected rotation angle of the steering wheel 121 is within a preset angle range.

That is, the controller 260 controls the barrier panel 220 to be turned on when converting into the three-dimensional image mode, adjusts the positions of the plurality of barriers of the barrier panel 220 based on the position of the user's line of sight, and controls the operation of the display panel 210 to output a three-dimensional image.

The controller 260 predicts whether the user's line of sight is not recognized based on at least one of the manipulation information of the steering wheel 121, the manipulation information of the lever 119, and the navigation information, and controls the operation of the cluster 200 to convert the three-dimensional image displayed through the cluster 200 into a two-dimensional image and display the converted two-dimensional image when the user's line of sight is predicted not to be recognized and display the converted two-dimensional image.

The manipulation information of the steering wheel 121 may include a rotation angle or a steering angle of the steering wheel 121 received through the detector 240, and a rotation angle or a steering angle of the steering wheel 121 received through the communication device 250.

The manipulation information of the lever 119 may include an operation state of the lever 119 detected through the detector 240, may include turn-on information of the direction indicators detected through the detector 240, and may include information on the operating state of the lever 119 or the turn-on information of the direction indicators received through the communication device 250.

More specifically, when a steering angle of the steering wheel 121 is within a preset reference angle range, the controller 260 predicts that the user's line of sight is to be recognized and determines that the condition for performing the three-dimensional image mode is satisfied, and when a steering angle of the steering wheel 121 deviates from the preset reference angle range, the controller 260 predicts that the user's line of sight is not to be recognized and determines that the condition for performing the three-dimensional image mode is not satisfied.

The controller 260 predicts that the user's line of sight is to be recognized when the turn-on command of the direction indicator is not received from the lever 119 and determines that a condition for performing the three-dimensional image mode is satisfied, and predicts that the user's line of sight is not to be recognized when the turn-on command of the direction indicator is received from the lever 119 and determines that the condition for performing the three-dimensional image mode is not satisfied.

The controller 260 may receive a turn-on signal from the direction indicator and may predict whether or not the user's line of sight is recognized from the received turn-on signal.

The controller 260, when navigation information is received from the vehicle terminal, determines whether the received navigation information includes change information of the driving direction within a predetermined distance, determines that the received navigation information does not include change information of the driving direction within the predetermined distance, and predicts that the user's line of sight is to be recognized and determines that the condition for performing the three-dimensional image mode is satisfied, and when it is determined that the received navigation information includes change information of the driving direction within the predetermined distance, predicts that the user's line of sight is not to be recognized and determines that the condition for performing the three-dimensional image mode is not satisfied.

The controller 260, when navigation information is received from the vehicle terminal, determines whether the received navigation information includes information of a steep curved road having a predetermined curvature or more within a predetermined distance, determines that the received navigation information does not include information of a steep curved road having a predetermined curvature or more within the predetermined distance, and predicts that the user's line of sight is to be recognized and determines that the condition for performing the three-dimensional image mode is satisfied, and when it is determined that the received navigation information includes information of a steep curved road having a predetermined curvature or more within the predetermined distance, predicts that the user's line of sight is not to be recognized and determines that the condition for performing the three-dimensional image mode is not satisfied.

The controller 260 may predict whether or not the user's line of sight is recognized by determining and predicting a manipulation state of the steering wheel 121 based on the information received through the detector 240 and the communication device 250, and may determine whether or not the condition for performing the three-dimensional image mode is satisfied by predicting whether or not the user's line of sight is recognized.

That is, the controller 260 may determine whether or not the condition for performing the three-dimensional image mode is satisfied based on the manipulation state of the steering wheel 121, control the operations of the display panel 210 and the barrier panel 220 to recognize the user's line of sight based on the image of the image obtainer 230 and perform the three-dimensional image mode based on the recognized line of sight of the user when it is determined that the condition for performing the three-dimensional image mode is satisfied, and control the operations of the display panel 210 and the barrier panel 220 to perform the two-dimensional image mode when it is determined that the condition for performing the three-dimensional image mode is not satisfied.

The controller 260 may perform a converting mode of the two-dimensional image mode when a converting command of the two-dimensional image mode is inputted through the input 116, and control the display panel 210 to convert the three-dimensional image displayed through the cluster 200 into a two-dimensional image when the user's face is not recognized through the image obtainer 230 and display the two-dimensional image.

The controller 260 may perform a maintenance mode of the three-dimensional image mode when a maintenance command of the three-dimensional image mode is inputted through the input 116, stop the position adjustment of the plurality of barriers of the barrier panel 220 when the user's face is not recognized through the image obtainer 230 so that the positions of the plurality of barriers of the barrier panel 220 are fixed, and control the display panel 210 to display a three-dimensional image.

The controller 260 may also determine that the user's line of sight deviates from the image obtainer 230 when it is determined that the user's line of sight is not recognized in a state of satisfying the condition for performing the three-dimensional image mode, and control the display panel 210 to convert the three-dimensional image displayed through the cluster 200 into a two-dimensional image and display the converted two-dimensional image.

Herein, the deviation of the user's line of sight in the field of sight of the image obtainer 230 may include a user moving out of the viewing angle of the image obtainer 230, bowing his/her head, or turning his/her head.

When it is determined that the user's line of sight is not recognized in a state of satisfying the condition for performing the three-dimensional image mode, the controller 260 causes a pop-up window to be displayed through the cluster 200.

The storage 261 stores a reference angle range and a predetermined distance to a direction change point.

The storage 261 may store position adjustment values of the plurality of barriers corresponding to a position of the user's line of sight.

The driver 270 drives the cluster 200, which is a display device, based on a control command of the controller 260.

The driver 270 turns on/off the barrier panel 220 based on the control command of the controller 260, and adjusts the positions of the plurality of barriers of the barrier panel 220 when the barrier panel 220 is turned on.

The driver 270 drives the display panel 210 based on the control command of the controller 260 so that a two-dimensional image or a three-dimensional image is output through the display panel 210.

The driver 270 turns on/off the light source of the backlight unit 212 when driving the display panel 210, and changes the light transmittance of the liquid crystal panel.

At least one component may be added or deleted corresponding to the performance of the components of the vehicle and cluster shown in FIG. 6. In addition, it will be easily understood by those skilled in the art that the mutual position of the components may be changed corresponding to the performance or structure of the system.

Each of the components shown in FIG. 6 refers to a hardware component such as software and/or a Field Programmable Gate Array (FPGA) and an Application Specific Integrated Circuit (ASIC).

Figure 7:
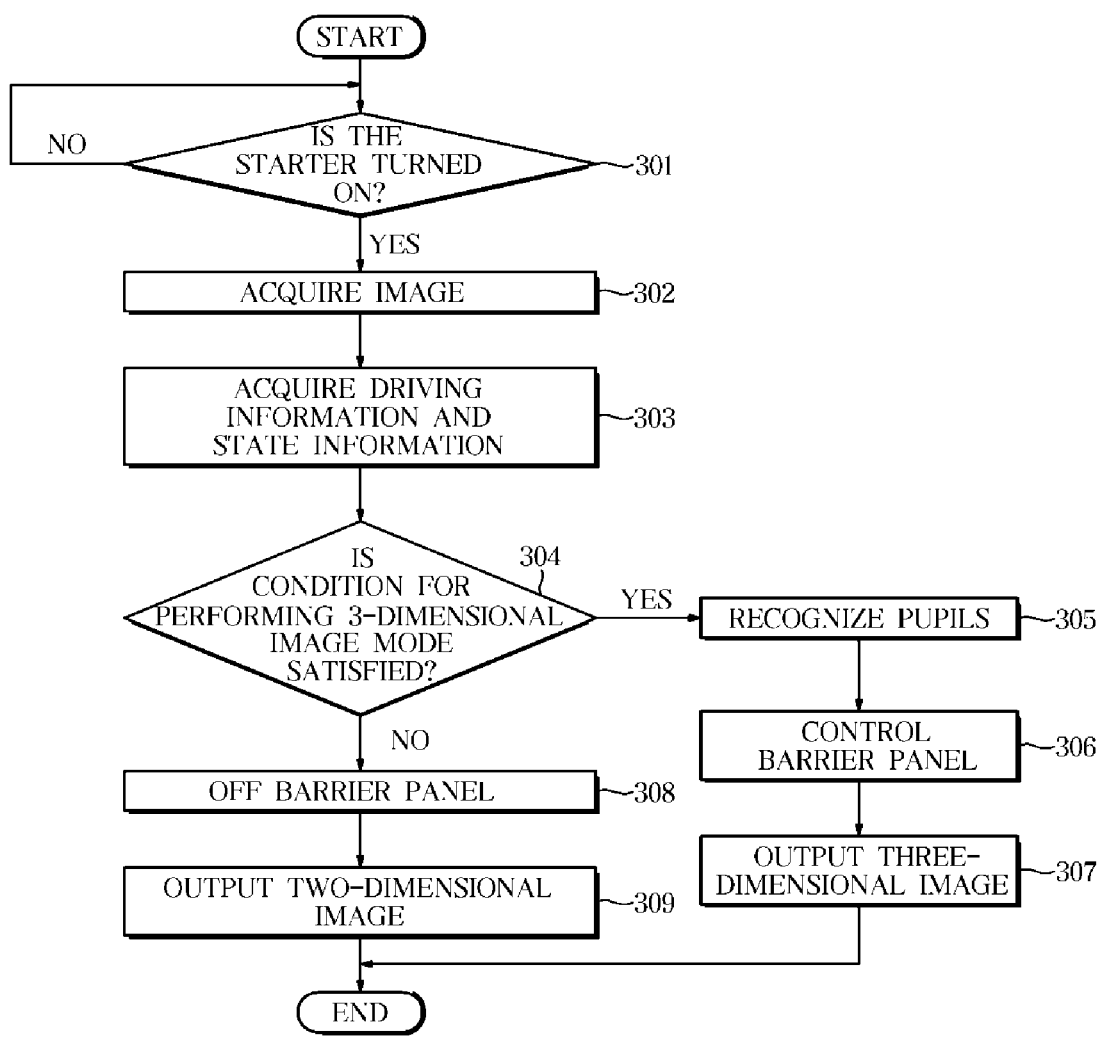
FIG. 7 is a control flowchart of a vehicle according to an exemplary embodiment of the present disclosure.

FIG. 7 is a control flowchart of a vehicle according to an embodiment, and is a flowchart of a display control configuration of a cluster.

The vehicle 100 may perform the maintenance mode of the three-dimensional image mode when a maintenance command of the three-dimensional image mode is inputted through the input 116, stop the position adjustment of the plurality of barriers of the barrier panel 220 when the user's face is not recognized through the image obtainer 230 so that the positions of the plurality of barriers of the barrier panel 220 are fixed, and output a three-dimensional image through the display panel 210.

The vehicle 100 performs the converting mode of the two-dimensional image mode when a converting command of the two-dimensional image mode is inputted through the input 116, and converts the three-dimensional image displayed through the cluster 200 into a two-dimensional image when the user's face is not recognized through the image obtainer 230 and displays the two-dimensional image.

The sequence of converting the image output mode of the cluster 200 into the two-dimensional image mode will be described below with reference to FIG. 7.

When the starter of the vehicle is turned on (301), the vehicle supplies power to various loads provided in the vehicle, so that the loads are operated.

The vehicle supplies power for driving the cluster, and operates the image obtainer to acquire an image of the inside of the vehicle (302) and acquires state information and driving information of the vehicle (303).

At this time, the cluster displays the acquired state information and driving information of the vehicle as a three-dimensional image.

The vehicle determines (304) whether the condition for performing the three-dimensional image mode is satisfied based on the state information and driving information of the vehicle. Herein, the state information and driving information of the vehicle may be information corresponding to the manipulation state of the steering wheel.

Determination of whether or not the condition for performing the three-dimensional image mode is satisfied will be described in detail below.

The vehicle detects a rotation angle of the steering wheel, predicts that the user's line of sight is to be recognized when the detected rotation angle of the steering wheel is within a predetermined reference angle range and determines that the condition for performing the three-dimensional image mode is satisfied, and predicts that the user's line of sight is not to be recognized when the acquired rotation angle of the steering wheel deviates from the predetermined reference angle range and determines that the condition for performing the three-dimensional image mode is not satisfied.

The vehicle acquires a rotation angle of the steering wheel based on the steering angle of the vehicle, predicts that the user's line of sight is to be recognized when the acquired rotation angle of the steering wheel is within a predetermined reference angle range and determines that the condition for performing the three-dimensional image mode is satisfied, and predicts that the user's line of sight is not to be recognized when the acquired rotation angle of the steering wheel deviates from the predetermined reference angle range and determines that the condition for performing the three-dimensional image mode is not satisfied.

The vehicle may predict manipulation information of the steering wheel due to a left turn, a right turn, a lane change, and the like, and may determine whether the condition for performing the three-dimensional image mode is satisfied based on the predicted manipulation information of the steering wheel.

More specifically, the vehicle predicts that the user's line of sight is to be recognized when a turn-on command of the direction indicator is not received from the lever and determines that the condition for performing the three-dimensional image mode is satisfied, and predicts that the user's line of sight is to be recognized when a turn-on command of the direction indicator is received from the lever and determines that the condition for performing the three-dimensional image mode is not satisfied.

The vehicle may receive a turn-on signal from the direction indicator and determine that the condition for performing the three-dimensional image mode is satisfied from the received turn-on signal.

The vehicle determines, when navigation information is received from the vehicle terminal, whether the received navigation information includes change information of the driving direction within a predetermined distance, determines that the received navigation information does not include the change information of the driving direction within the predetermined distance, predicts that the user's line of sight is to be recognized and determines that the condition for performing the three-dimensional image mode is satisfied, and predicts, when it is determined that the received navigation information includes change information of the driving direction within the predetermined distance, that the user's line of sight is not to be recognized and determines that the condition for performing the three-dimensional image mode is not satisfied.

The vehicle determines, when navigation information is received from the vehicle terminal, whether the received navigation information includes a steep curved road having a predetermined curvature or more within a predetermined distance, determines that the received navigation information does not include a steep curved road having a predetermined curvature or more within the predetermined distance, predicts that the user's line of sight is to be recognized and determines that the condition for performing the three-dimensional image mode is satisfied, and predicts, when it is determined that the received navigation information includes a steep curved road having a predetermined curvature or more within the predetermined distance, that the user's line of sight is not to be recognized and determines that the condition for performing the three-dimensional image mode is not satisfied.

The vehicle recognizes a face image of the user on the image acquired through the image obtainer when it is determined that the condition for performing the three-dimensional image mode is satisfied and recognizes (305) the user's eye movement (i.e., pupils) in the recognized face image. At this time, the vehicle may determine where the user's line of sight is headed based on the change in the positions of the recognized pupils.

The vehicle controls (306) the adjustment of the positions of the plurality of barriers of the barrier panel corresponding to the user's line of sight and outputs (307) a three-dimensional image through the display panel.

Herein, when adjusting the positions of the plurality of barriers, the position adjustment value is referred to as a barrier offset. By moving the parallax barrier by the movement of the plurality of barriers implemented in the barrier panel, the barrier offset may be adjusted.

When the viewing position of the user is the center, the barrier offset may be zero.

Figure 8A:
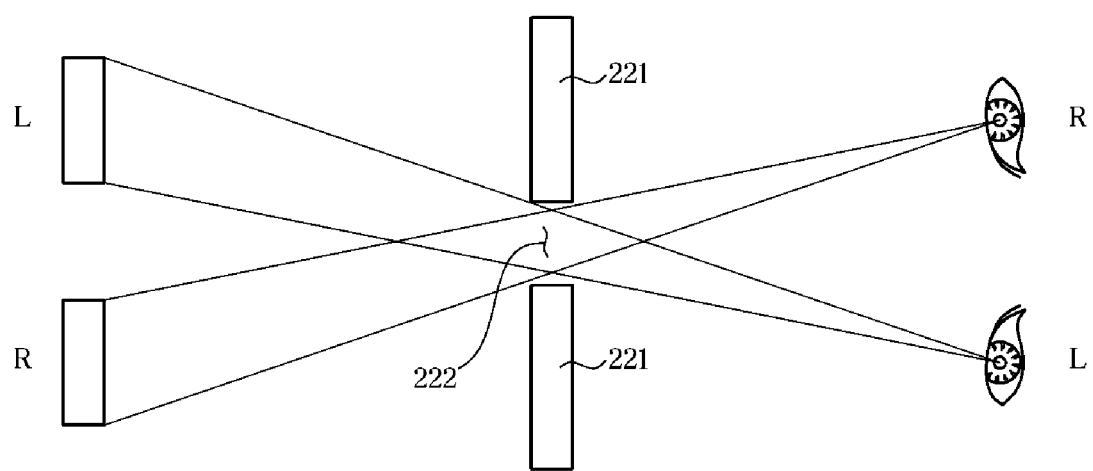
FIGS. 8A, 8B and 8C are views illustrating control examples of a barrier panel in a three-dimensional image display control of a cluster of a vehicle according to an exemplary embodiment of the present disclosure.

As shown in FIG. 8A, the vehicle sets the position adjustment value of the plurality of barriers of the barrier panel to 0 when it is determined that the user's line of sight is located at the center, and forms the block sections and the slit section on the barrier panel of the cluster based on the set position adjustment value.

In this case, the light of the left eye image and the light of the right eye image of the display panel of the cluster are transmitted through the slit section formed between the two barriers forming the block sections of the barrier panel.

The user may see the left eye image and the right eye image of the display panel passing through the slit section of the barrier panel at the center position through the left eye and the right eye, respectively.

Figure 8B:
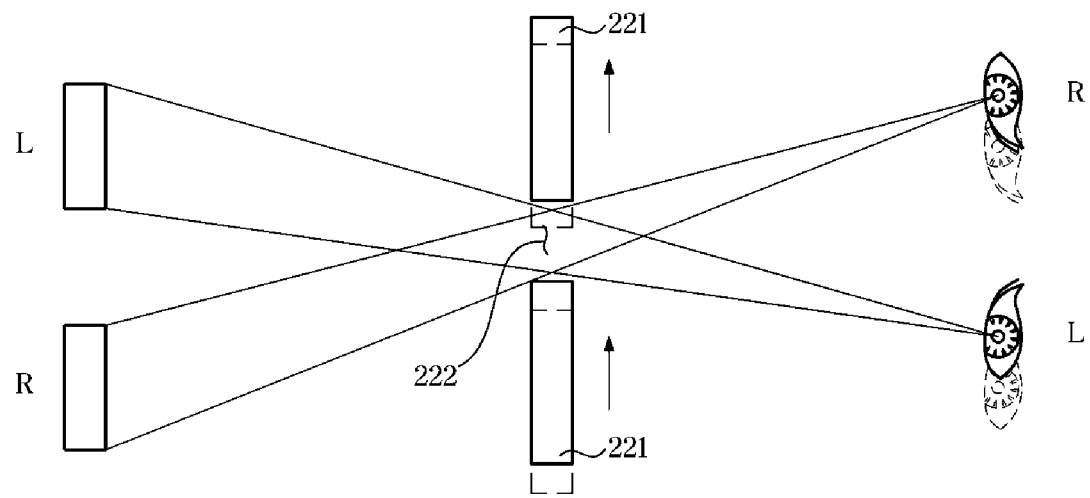

As shown in FIG. 8B, the vehicle adjusts the positions of the plurality of barriers of the barrier panel based on the adjustment value corresponding to a reference distance when it is determined that the user's line of sight has moved to the right by the reference distance, so that the block sections and the slit section corresponding to the adjustment value are formed in the barrier panel.

For example, assuming that the adjustment value corresponding to the reference distance is 1, the positions of the plurality of barriers on the barrier panel may be adjusted to the right by the adjustment value 1.

In this case, the block sections and the slit section of the barrier panel may be adjusted to the right direction based on the position of the user's line of sight, and the light of the left eye image and the light of the right eye image of the display panel pass through the slit section formed between the two positioned barriers.

In a state where the left eye and the right eye has moved to the right by the reference distance, the user may see the left eye image and the right eye image of the display panel passing through the slit section of the barrier panel through the left eye and the right eye, respectively.

Figure 8C:
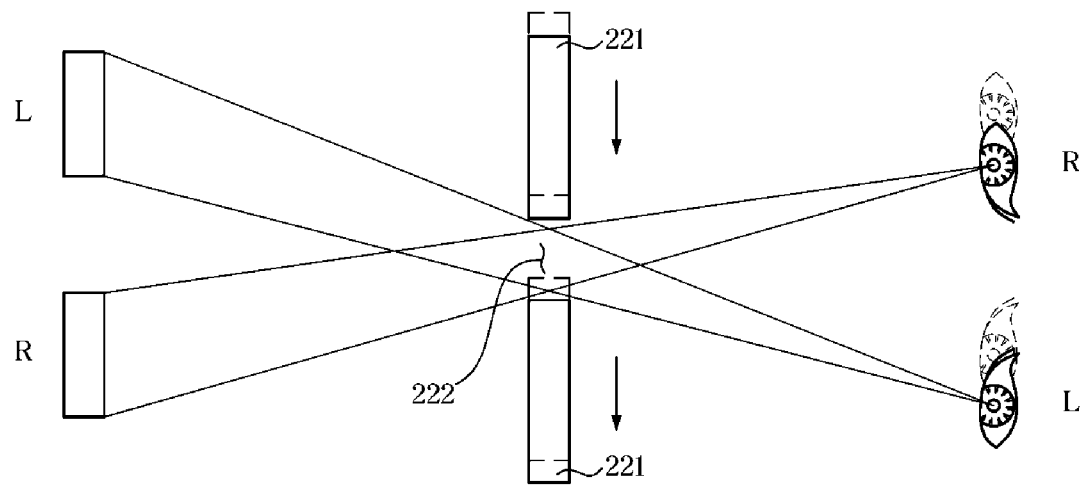

As shown in FIG. 8C, the vehicle adjusts the positions of the plurality of barriers of the barrier panel based on the adjustment value corresponding to a reference distance when it is determined that the user's line of sight has moved to the left by the reference distance, so that the block sections and the slit section corresponding to the adjustment value are formed in the barrier panel.

For example, assuming that the adjustment value corresponding to the reference distance is 1, the positions of the plurality of barriers on the barrier panel may be adjusted to the left by the adjustment value 1.

In this case, the block sections and the slit section of the barrier panel may be adjusted to the left direction based on the position of the user's line of sight, and the light of the left eye image and the light of the right eye image of the display panel pass through the slit section formed between the two positioned barriers.

In a state where the left eye and the right eye has moved to the left by the reference distance, the user may see the left eye image and the right eye image of the display panel passing through the slit section of the barrier panel through the left eye and the right eye, respectively.

In addition, the vehicle may adjust the barrier offset by moving the disparity image, which is a three-dimensional image output to the display panel of the cluster. This will be described below with reference to FIGS. 9A and 9B.

Figure 9A:
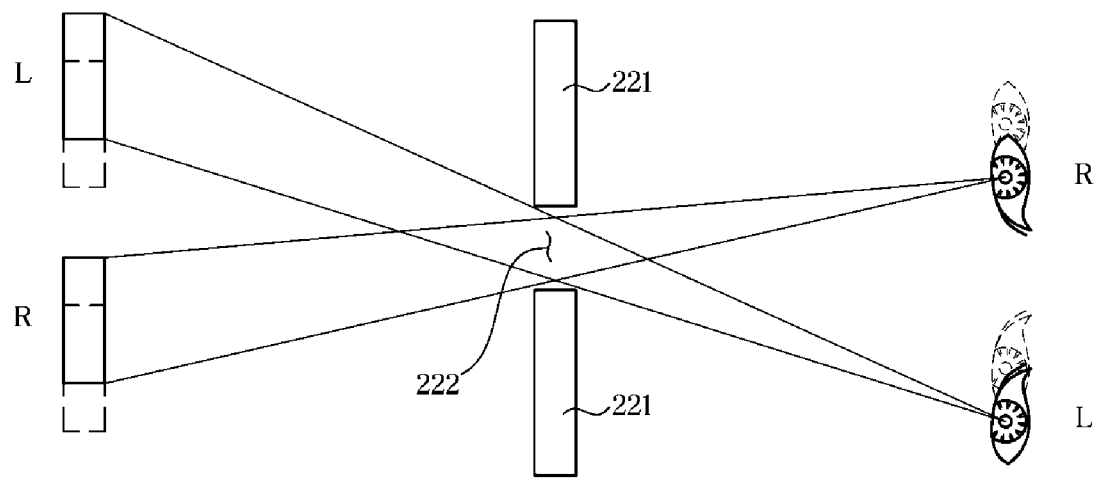
FIGS. 9A and 9B are views illustrating control examples of a display panel in a three-dimensional image display control of a cluster of a vehicle according to an exemplary embodiment of the present disclosure.

As shown in FIG. 9A, the vehicle adjusts the positions of the left eye image and the right eye image displayed on the display panel based on the adjustment value corresponding to a reference distance when it is determined that the user's line of sight has moved to the left by the reference distance.

For example, assuming that the adjustment value corresponding to the reference distance is 1, the positions of the left eye image and the right eye image displayed on the display panel may be adjusted to the right by the adjustment value 1.

In this case, the left eye image whose position is adjusted to the right on the display panel is seen from the left eye of the user by passing through the slit section, and the right eye image whose position is adjusted to the right on the display panel is seen from the right eye of the user by passing through the slit section.

Figure 9B:
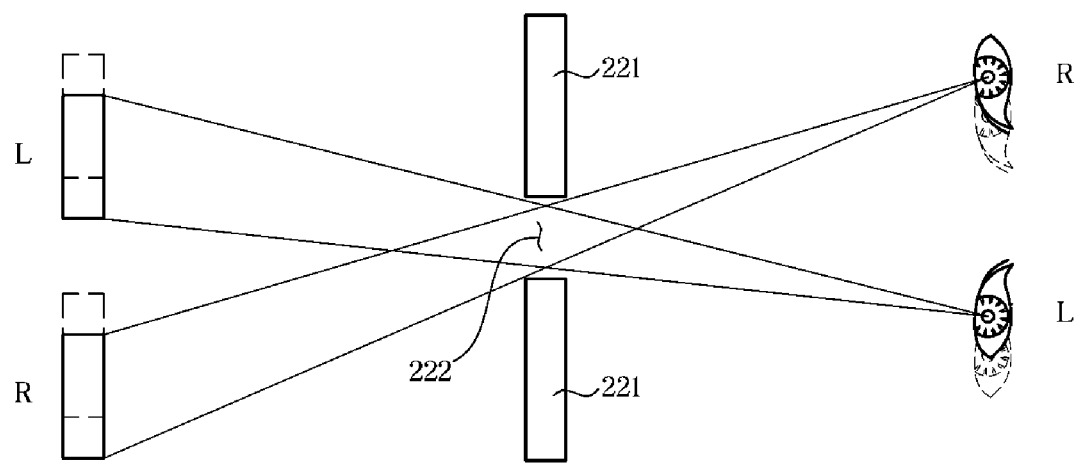

As shown in FIG. 9B, the vehicle adjusts the positions of the left eye image and the right eye image displayed on the display panel based on the adjustment value corresponding to a reference distance when it is determined that the user's line of sight has moved to the right by the reference distance.

For example, assuming that the adjustment value corresponding to the reference distance is 1, the positions of the left eye image and the right eye image displayed on the display panel may be adjusted to the left by the adjustment value 1.

In this case, the left eye image whose position is adjusted to the left on the display panel is seen from the left eye of the user by passing through the slit section, and the right eye image whose position is adjusted to the left on the display panel is seen from the right eye of the user by passing through the slit section.

In addition, when it is determined that the user's line of sight is not recognized in a state where the condition for performing the three-dimensional image mode is satisfied, the vehicle determines that the user's line of sight deviates from the sight of the image obtainer, and may convert the three-dimensional image displayed through the cluster into a two-dimensional image and display the two-dimensional image.

When it is determined that the condition for performing the three-dimensional image mode is not satisfied, the vehicle determines that the user's pupils may not be recognized through the image obtainer and converts the three-dimensional image displayed through the cluster into a two-dimensional image and displays the two-dimensional image.

Herein, the displaying of a two-dimensional image through the cluster includes turn-off controlling the barrier panel (308) and outputting the two-dimensional image through the display panel (309).

The turn-off controlling of the barrier panel includes forming all of the plurality of barriers of the barrier panel to be the slit section through which light passes. Accordingly, the barrier panel may be entirely transparent, and a two-dimensional image on the display panel may pass through the transparent barrier panel.

Accordingly, the cluster which is a display device may prevent a flicker phenomenon which is generated by repeating the on/off operation of the barrier as the recognition success and failure of the user's line of sight are repeated according to the positional change caused by the manipulation of the steering wheel.

When a steering angle of the steering wheel is within a preset reference angle range while the driving information and the state information of the vehicle are displayed as a two-dimensional image through the cluster, the vehicle predicts that the user's line of sight is to be recognized and converts the two-dimensional image mode to the three-dimensional image mode.

Figure 10:
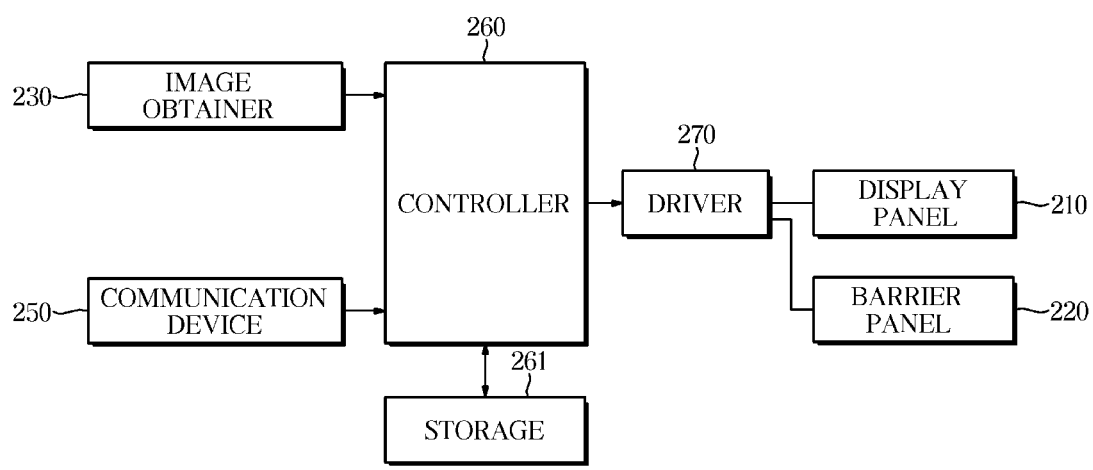
FIG. 10 is a control configuration diagram of a vehicle according to another exemplary embodiment of the present disclosure.

FIG. 10 is a control configuration diagram of a vehicle according to another embodiment.

The vehicle according to the present embodiment is a vehicle having a cluster that displays state information and driving information of the vehicle as a three-dimensional image.

The description of the same configurations as those of the vehicle of the above embodiment among configurations of the vehicle according to the present embodiment is omitted.

The vehicle 100 includes the image obtainer 230, a communication device 251, a controller 262, the storage 261, and the driver 270.

The image obtainer 230 acquires images of the surroundings of the cluster 200 and images of the surroundings of the steering wheel 121 among indoor images of the vehicle 100 in order to acquire the user's face image.

The communication device 251 receives manipulation information of the steering wheel 121.

Herein, the manipulation information of the steering wheel may include a rotation angle of the steering wheel 121 and a steering angle of the vehicle.

The communication device 251 may receive the manipulation information of the lever 119 for predicting the manipulation information of the steering wheel 121.

The communication device 251 may receive a turn-on signal of the left turn indicator and a turn-on signal of the right turn indicator by the manipulation of the lever 119.

The communication device 251 may receive navigation information from the vehicle terminal 118 by performing communication with the vehicle terminal 118 and transmit the received navigation information to the controller 262.

Herein, the navigation information may include left turn information, right turn information, distance information to the left turn point, and distance information to the right turn point.

The navigation information may further include information about a right steep curved road and a left steep curved road.

The communication device 251 communicates with a plurality of sensors (not shown) provided in the vehicle, and receives driving information and state information of the vehicle from the plurality of sensors.

The driving information of the vehicle may include information such as the rotational speed of the engine, the driving speed, the driving distance, and the driving record.

The state information of the vehicle may include information such as door opening and closing, fuel amount, safety belt wearing state, internal temperature, external temperature, fuel shortage, cooling water temperature, battery discharge and the like.

The communication device 251 may include one or more components that enable communication with the controller 162. For example, the communication device 251 may include at least one of a short-range communication module, a wired communication module, and a wireless communication module.

The short-range communication module may include various short-range communication modules that transmit and receive signals using a wireless communication network in a short distance such as a Bluetooth module, an infrared communication module, an RFID (Radio Frequency Identification) communication module, a WLAN (Wireless Local Access Network) communication module, an NFC communication module, and a Zigbee communication module.

The wired communication module may include various wired communication modules such as a CAN (Controller Area Network) communication module, a LAN (Local Area Network) module, a WAN (Wide Area Network) module, or a VAN (Value Added Network), as well as various cable communication modules such as a USB (Universal Serial Bus), an HDMI (High Definition Multimedia Interface), a DVI (Digital Visual Interface), an RS-232 (recommended standard 232), power line communication, and a POTS (plain old telephone service).

The wired communication module may further include a LIN (Local Interconnect Network).

The wireless communication module, in addition to the Wi-Fi module and the wireless broadband module, may include wireless communication modules supporting various wireless communication methods such as a GSM (Global System for Mobile Communication), a CDMA (Code Division Multiple Access), a WCDMA (Wideband Code Division Multiple Access), a UMTS (Universal Mobile Telecommunications System), a TDMA (Time Division Multiple Access), and LTE (Long Term Evolution).

The controller 262 receives various kinds of information detected by the plurality of sensors through the communication device 251 and controls the operation of the cluster 200 to display the received various kinds of information.

The controller 262 may receive an image in the visual field of the image obtainer 230.

The controller 262 acquires the face image of the user from the image acquired by the image obtainer 230 and recognizes the user's line of sight from the acquired face image.

The controller 262 may determine where the user's line of sight is headed based on the recognized line of sight. That is, the controller 262 may recognize the positions of the user's pupils and the change in the positions of the pupils.

The controller 262 may adjust the positions of the plurality of barriers of the barrier panel 220 so that a three-dimensional image is displayed corresponding to the user's line of sight, and may control the display panel 210 so that the three-dimensional image is outputted. Herein, the position adjustment value when adjusting the positions of the plurality of barriers is referred to as a barrier offset.

That is, the controller 262 may adjust the barrier offset by moving the parallax barrier due to the movement of the plurality of barriers implemented in the barrier panel 220.

When the viewing position of the user is the center, the barrier offset may be zero.

That is, the controller 262 controls the barrier panel 220 to be turned on when the user's face is recognized through the image obtainer 230, adjusts the positions of the plurality of barriers of the barrier panel 220 based on the position of the user's line of sight, and controls the operation of the display panel 210 to output a three-dimensional image.

Herein, the turn-on controlling of the barrier panel 220 includes forming some sections of the plurality of barriers of the barrier panel 220 to be opaque block sections and the other sections of the plurality of barriers of the barrier panel 220 to be slit sections. In this case, the block sections and the slit sections may be formed alternately.

The barrier panel 220 may implement a parallax barrier by the block sections and the slit sections.

The parallax barrier implemented in the barrier panel 220 and a three-dimensional image on the display panel 210 corresponding to the parallax barrier may be arranged to correspond to the position of the user's line of sight. In this case, the user may feel the stereoscopic effect from the image displayed through the cluster 200.

The controller 262 may stop the position adjustment of the plurality of barriers of the barrier panel 220 when it is determined that the user's face is not recognized through the image obtainer 230 so that the positions of the plurality of barriers of the barrier panel 220 are fixed, and control the display panel 210 to display a three-dimensional image.

The controller 262 may adjust the barrier offset by moving the disparity image, which is a three-dimensional image output to the display panel 210.

The controller 262 stores the adjustment values when controlling to stop the position adjustment of the plurality of barriers of the barrier panel 220, and fixes the positions of the plurality of barriers with the stored adjustment values.

The controller 262 may control the cluster 200 to display the stop information of the three-dimensional image mode by tracking the user's line of sight when the three-dimensional image is displayed in a state where the positions of the plurality of barriers are fixed.

When executing the three-dimensional image mode in a state where the positions of the plurality of barriers are fixed, the controller 262 confirms the detected rotation angle of the steering wheel, and performs converting control to the three-dimensional image mode by the tracking of the user's line of sight when the detected rotation angle of the steering wheel is within a preset angle range.

The controller 260 predicts whether the user's line of sight is not recognized based on at least one of the manipulation information of the steering wheel 121, the manipulation information of the lever 119, and the navigation information, and controls the operation of the cluster 200 to display the three-dimensional image by the tracking of the user's line of sight as a three-dimensional image by stoppage of the tracking of the user's line of sight when the user's line of sight is predicted not to be recognized and display the three-dimensional image.

The manipulation information of the steering wheel 121 may include a rotation angle or a steering angle of the steering wheel 121 received through the detector 240, and a rotation angle or a steering angle of the steering wheel 121 received through the communication device 250.

The manipulation information of the lever 119 may include an operation state of the lever 119 detected through the detector 240, may include turn-on information of the direction indicators detected through the detector 240, and may include information on the operating state of the lever 119 or the turn-on information of the direction indicators received through the communication device 250.

More specifically, when a steering angle of the steering wheel 121 is within a preset reference angle range, the controller 262 predicts that the user's line of sight is to be recognized and determines that the condition for performing the three-dimensional image mode is satisfied, and when a steering angle of the steering wheel 121 deviates from the preset reference angle range, the controller 260 predicts that the user's line of sight is not to be recognized and determines that the condition for performing the three-dimensional image mode is not satisfied.

The controller 262 predicts that the user's line of sight is to be recognized when the turn-on command of the direction indicator is not received from the lever 119 and determines that the condition for performing the three-dimensional image mode is satisfied, and predicts that the user's line of sight is not to be recognized when the turn-on command of the direction indicator is received from the lever 119 and determines that the condition for performing the three-dimensional image mode is not satisfied.

The controller 262 may receive a turn-on signal from the direction indicator and may predict whether or not the user's line of sight is recognized from the received turn-on signal.

The controller 262, when navigation information is received from the vehicle terminal, determines whether the received navigation information includes change information of the driving direction within a predetermined distance, determines that the received navigation information does not include change information of the driving direction within the predetermined distance, and predicts that the user's line of sight is to be recognized and determines that the condition for performing the three-dimensional image mode is satisfied. When it is determined that the received navigation information includes change information of the driving direction within the predetermined distance, the controller 262 predicts that the user's line of sight is not to be recognized and determines that the condition for performing the three-dimensional image mode is not satisfied.

The controller 262, when navigation information is received from the vehicle terminal, determines whether the received navigation information includes information of a steep curved road having a predetermined curvature or more within a predetermined distance, determines that the received navigation information does not include information of a steep curved road having a predetermined curvature or more within the predetermined distance, and predicts that the user's line of sight is to be recognized and determines that the condition for performing the three-dimensional image mode is satisfied. When it is determined that the received navigation information includes information of a steep curved road having a predetermined curvature or more within the predetermined distance, the controller 262 predicts that the user's line of sight is not to be recognized and determines that the condition for performing the three-dimensional image mode is not satisfied.

The controller 262 may predict whether or not the user's line of sight is recognized by determining and predicting a manipulation state of the steering wheel 121 based on the information received through the communication device 250, and may determine whether or not the condition for performing the three-dimensional image mode is satisfied by predicting whether or not the user's line of sight is recognized.

That is, the controller 262 may determine whether or not the condition for performing the three-dimensional image mode is satisfied based on the manipulation state of the steering wheel 121, control the operations of the display panel 210 and the barrier panel 220 to recognize the user's line of sight based on the image of the image obtainer 230 and perform the three-dimensional image mode by the tracking of the user's line of sight based on the recognized line of sight of the user when it is determined that the condition for performing the three-dimensional image mode is satisfied, and control the operations of the display panel 210 and the barrier panel 220 to perform the two-dimensional image mode by the stoppage of the tracking of the user's line of sight when it is determined that the condition for performing the three-dimensional image mode by the tracking of the user's line of sight is not satisfied.

The controller 262 may also determine that the user's line of sight deviates from the image obtainer 230 when it is determined that the user's line of sight is not recognized in a state of satisfying the condition for performing the three-dimensional image mode by the tracking of the user's line of sight, and control the display panel 210 to convert the three-dimensional image by the tracking of the user's line of sight displayed through the cluster 200 into a three-dimensional image by the stoppage of the tracking of the user's line of sight and display the converted three-dimensional image.

Herein, the deviation of the user's line of sight in the field of sight of the image obtainer 230 may include the user moving out of the viewing angle of the image obtainer 230, bowing his/her head, or turning his/her head.

When it is determined that the user's line of sight is not recognized in a state of satisfying the condition for performing the three-dimensional image mode, the controller 262 causes a pop-up window to be displayed through the cluster 200.

The controller 262 may be implemented with a memory (not shown) that stores an algorithm for controlling the operation of the vehicle 100 or components in the cluster 200 that is a display device, or data for programs reproducing the algorithm, and a processor (not shown) that performs the above-described operations using data stored in the memory. In this case, the memory and the processor may be implemented as separate chips. Alternatively, the memory and the processor may be implemented on a single chip.

The storage 261 stores a reference angle range and a predetermined distance to a direction change point.

The storage 261 may store position adjustment values of the plurality of barriers corresponding to a position of the user's line of sight.

The storage 261 may store adjustment values of the plurality of barriers when a three-dimensional image by the tracking of the user's line of sight is displayed.

The storage 261 may be a memory implemented as a separate chip from the above-described processor in connection with the controller 262, and may be implemented as a single chip with the processor.

The storage 261 may be implemented by at least one of a non-volatile memory device such as a cache, a ROM (Read Only Memory), a PROM (Programmable ROM), an EPROM (Erasable Programmable ROM), an EEPROM (Electrically Erasable Programmable ROM), and a flash memory, a volatile memory device such as a RAM (Random Access Memory), and a storage medium such as a HDD (hard disk drive) and a CD-ROM, but is not limited thereto.

The driver 270 drives the cluster 200, which is a display device, based on a control command of the controller 262.

The driver 270 turns on/off the barrier panel 220 based on the control command of the controller 262, and adjusts the positions of the plurality of barriers of the barrier panel 220 when the barrier panel 220 is turned on.

The driver 270 drives the display panel 210 based on the control command of the controller 262 so that a three-dimensional image is output through the display panel 210.

The driver 270 turns on/off the light source of the backlight unit 212 when driving the display panel 210, and changes the light transmittance of the liquid crystal panel.

At least one component may be added or deleted corresponding to the performance of the components of the vehicle and cluster shown in FIG. 10. In addition, it will be easily understood by those skilled in the art that the mutual position of the components may be changed corresponding to the performance or structure of the system.

Each of the components shown in FIG. 10 refers to a hardware component such as software and/or a Field Programmable Gate Array (FPGA) and an Application Specific Integrated Circuit (ASIC).

Figure 11:
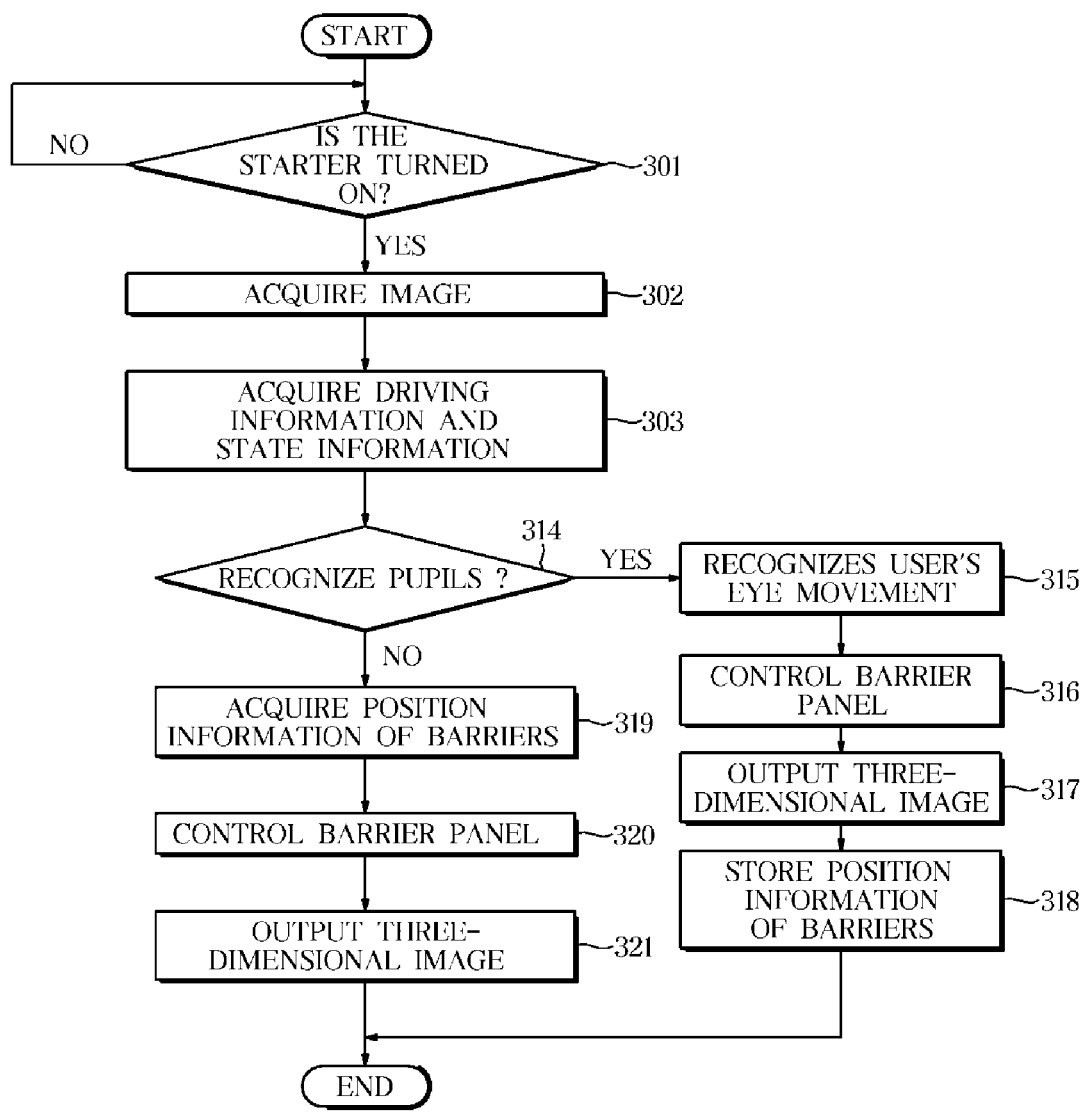
FIG. 11 is a control flowchart of a vehicle according to another exemplary embodiment of the present disclosure.

FIG. 11 is a control flowchart of a vehicle according to another embodiment, and is a flowchart of a display control configuration of a cluster.

When the starter of the vehicle is turned on (311), the vehicle supplies power to various loads provided in the vehicle, so that the loads are operated.

The vehicle supplies power for driving the cluster, and operates the image obtainer to acquire an image of the inside of the vehicle (312) and acquires state information and driving information of the vehicle (313).

At this time, the cluster displays the acquired state information and driving information of the vehicle as a three-dimensional image.

The vehicle determines (314) whether the condition for performing the three-dimensional image mode by the tracking of the user's line of sight is satisfied based on the state information and driving information of the vehicle. Herein, the state information and driving information of the vehicle may be information corresponding to the manipulation state of the steering wheel.

Determination of whether or not the condition for performing the three-dimensional image mode by the tracking of the user's line of sight is satisfied will be described in detail below.

The vehicle detects a rotation angle of the steering wheel, predicts that the user's line of sight is to be recognized when the detected rotation angle of the steering wheel is within a predetermined reference angle range and determines that the condition for performing the three-dimensional image mode is satisfied, and predicts that the user's line of sight is not to be recognized when the acquired rotation angle of the steering wheel deviates from the predetermined reference angle range and determines that the condition for performing the three-dimensional image mode by the tracking of the user's line of sight is not satisfied.

The vehicle acquires a rotation angle of the steering wheel based on the steering angle of the vehicle, predicts that the user's line of sight is to be recognized when the acquired rotation angle of the steering wheel is within a predetermined reference angle range and determines that the condition for performing the three-dimensional image mode is satisfied, and predicts that the user's line of sight is not to be recognized when the acquired rotation angle of the steering wheel deviates from the predetermined reference angle range and determines that the condition for performing the three-dimensional image mode by the tracking of the user's line of sight is not satisfied.

The vehicle may predict manipulation information of the steering wheel due to a left turn, a right turn, a lane change, and the like, and may determine whether the condition for performing the three-dimensional image mode is satisfied based on the predicted manipulation information of the steering wheel.

More specifically, the vehicle predicts that the user's line of sight is to be recognized when a turn-on command of the direction indicator is not received from the lever and determines that the condition for performing the three-dimensional image mode is satisfied, and predicts that the user's line of sight is to be recognized when a turn-on command of the direction indicator is received from the lever and determines that the condition for performing the three-dimensional image mode by the tracking of the user's line of sight is not satisfied.

The vehicle may receive a turn-on signal from the direction indicator and determine that the condition for performing the three-dimensional image mode is satisfied from the received turn-on signal.

The vehicle determines, when navigation information is received from the vehicle terminal, whether the received navigation information includes change information of the driving direction within a predetermined distance, determines that the received navigation information does not include the change information of the driving direction within the predetermined distance, predicts that the user's line of sight is to be recognized and determines that the condition for performing the three-dimensional image mode is satisfied, and predicts, when it is determined that the received navigation information includes change information of the driving direction within the predetermined distance, that the user's line of sight is not to be recognized and determines that the condition for performing the three-dimensional image mode by the tracking of the user's line of sight is not satisfied.

The vehicle determines, when navigation information is received from the vehicle terminal, whether the received navigation information includes a steep curved road having a predetermined curvature or more within a predetermined distance, determines that the received navigation information does not include a steep curved road having a predetermined curvature or more within the predetermined distance, predicts that the user's line of sight is to be recognized and determines that the condition for performing the three-dimensional image mode is satisfied, and predicts, when it is determined that the received navigation information includes a steep curved road having a predetermined curvature or more within the predetermined distance, that the user's line of sight is not to be recognized and determines that the condition for performing the three-dimensional image mode by the tracking of the user's line of sight is not satisfied.

The vehicle recognizes a face image of the user on the image acquired through the image obtainer when it is determined that the condition for performing the three-dimensional image mode by the tracking of the user's line of sight is satisfied and recognizes (315) the user's eye movement (i.e., pupils) in the recognized face image. At this time, the vehicle may determine where the user's line of sight is headed based on the change in the positions of the recognized pupils.

The vehicle controls (316) the adjustment of the positions of the plurality of barriers of the barrier panel corresponding to the user's line of sight and outputs (317) a three-dimensional image through the display panel.

Herein, when adjusting the positions of the plurality of barriers, the position adjustment value is referred to as a barrier offset. By moving the parallax barrier by the movement of the plurality of barriers implemented in the barrier panel, the barrier offset may be adjusted.

When the viewing position of the user is the center, the barrier offset may be zero.

The vehicle stores the adjustment values when adjusting the positions of the plurality of barriers of the barrier panel corresponding to the tracking of the user's line of sight. That is, the vehicle may store (318) position information of the plurality of barriers of the barrier panel corresponding to the tracking of the user's line of sight.

When it is determined that the condition for performing the three-dimensional image mode by the tracking of the user's line of sight is not satisfied, the vehicle may determine that the user's pupils may not be recognized through the image obtainer 230 and convert the three-dimensional image by the tracking of the user's line of sight into a three-dimensional image by the stoppage of the tracking of the user's line of sight and display the three-dimensional image.

Herein, the converting to the three-dimensional image by the stoppage of the tracking of the user's line of sight and the displaying of the image includes controlling to stop the position adjustment of the plurality of barriers of the barrier panel and acquiring (319) the position information of the plurality of barriers at the time of stopping the position adjustment of the plurality of barriers, controlling (320) to fix the positions of the plurality of barriers based on the acquired position information of the plurality of barriers, and outputting (321) the three-dimensional image through the display panel.

Herein, the acquiring of the position information of the plurality of barriers may include acquiring the adjustment values of the plurality of barriers stored at the time of the stoppage of the position adjustment of the plurality of barriers.

The vehicle may fix the arrangement of the plurality of barriers of the barrier panel based on the position information of the barrier acquired at the time of fixing the plurality of barriers of the barrier panel.

The vehicle may also determine that the user's line of sight deviates from the image obtainer when it is determined that the user's line of sight is not recognized in a state of satisfying the condition for performing the three-dimensional image mode by the tracking of the user's line of sight, and convert the three-dimensional image by the tracking of the user's line of sight into a three-dimensional image by the stoppage of the tracking of the user's line of sight and display the converted three-dimensional image.

When a steering angle of the steering wheel is within a preset reference angle range while the driving information and the state information of the vehicle are displayed as a two-dimensional image by the stoppage of the tracking of the user's line of sight through the cluster, the vehicle predicts that the user's line of sight is to be recognized and converts the two-dimensional image mode to the three-dimensional image mode by the tracking of the user's line of sight.

Herein, the disclosed embodiments may be implemented in the form of a recording medium storing instructions executable by a computer. The instructions may be stored in the form of program code and, when executed by a processor, a program module may be created to perform the operations of the disclosed embodiments. The recording medium may be implemented as a computer-readable recording medium.

The computer-readable recording medium includes all kinds of recording media in which instructions which can be decrypted by a computer are stored. For example, there may be a ROM (Read Only Memory), a RAM (Random Access Memory), a magnetic tape, a magnetic disk, a flash memory, an optical data storage device, and the like.

As is apparent from the above, the present disclosure enables a user to view an optimal stereoscopic image by displaying a three-dimensional image corresponding to the user's line of sight, enables the user to recognize the failure of recognition of a line of sight by outputting notification information on the failure of recognition of the user's line of sight when the user's line of sight is not recognized and displaying a two-dimensional image, and allows the user to view a clear image even in a position not adjacent to the display device.

The present disclosure can prevent a flicker phenomenon caused by on/off of the barriers during the manipulation of the steering wheel by displaying an image displayed on the cluster as a two-dimensional image corresponding to the manipulation of the steering wheel.

The present disclosure can prevent a flicker phenomenon caused by on/off of the barriers due to tracking of the user's line of sight by displaying an image displayed on the cluster as a three-dimensional image when the recognition of the user's line of sight is impossible due to the manipulation of the steering wheel and stopping the control of the barrier panel according to the position of the user's line of sight.

The present disclosure can improve the safety of a vehicle by preventing the occurrence of the flicker phenomenon and thereby preventing confusion of the user, and can improve the recognition of the driving information and state information of the vehicle during driving. That is, the present disclosure can provide the user with an image of the cluster having improved stability.

As such, the present disclosure can improve the quality and merchantability of the cluster composed of a display device and a vehicle having the cluster, increase the satisfaction of the user, and ensure competitiveness of the product.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A vehicle comprising:
   a cluster including:
      a display panel; and
      a barrier panel disposed adjacent to the display panel and having a plurality of barriers;
   an image obtainer disposed adjacent the cluster to acquire an image;
   a lever to receive a turn-on command of a direction indicator;
   a steering wheel disposed adjacent the cluster and the image obtainer; and
   a controller configured to:
      determine whether or not a condition for performing a three-dimensional image mode is satisfied based on a manipulation state of the steering wheel;
      control operations of the display panel and the barrier panel to recognize a user's line of sight based on the image of the image obtainer;
      perform the three-dimensional image mode based on the recognized line of sight of the user when the condition for performing the three-dimensional image mode is satisfied;
      determine that the condition for performing the three-dimensional image mode is not satisfied when the turn-on command of the direction indicator is received by the lever; and
      control the operations of the display panel and the barrier panel to perform a two-dimensional image mode when the condition for performing the three-dimensional image mode is not satisfied.

2. The vehicle according to claim 1,
   wherein the controller, when controlling the three-dimensional image mode, adjusts positions of the plurality of barriers based on the recognized line of sight of the user and controls the display panel to output a three-dimensional image.

3. The vehicle according to claim 1,
   wherein the controller, when controlling the two-dimensional image mode, turns off the barrier panel and controls the display panel to output a two-dimensional image.

4. The vehicle according to claim 1, further comprising:
   a detector to detect a rotation angle of the steering wheel,
   wherein the controller determines that the condition for performing the three-dimensional image mode is satisfied when the detected rotation angle of the steering wheel is within a preset angle range.

5. A vehicle comprising:
   a cluster including:
      a display panel; and a barrier panel disposed adjacent to the display panel and having a plurality of barriers;
an image obtainer disposed adjacent the cluster to acquire an image;
a vehicle terminal configured to perform a navigation mode;
a steering wheel disposed adjacent the cluster and the image obtainer; and
a controller configure to:
  determine whether or not a condition for performing a three-dimensional image mode is satisfied based on a manipulation state of the steering wheel;
  control operations of the display panel and the barrier panel to recognize a user's line of sight based on the image of the image obtainer;
  perform the three-dimensional image mode based on the recognized line of sight of the user when the condition for performing the three-dimensional image mode is satisfied; and
  control the operations of the display panel and the barrier panel to perform a two-dimensional image mode when the condition for performing the three-dimensional image mode is not satisfied,
wherein, when navigation information is received from the vehicle terminal, the controller determines whether or not the received navigation information includes change information of a driving direction within a reference distance, and
when the received navigation information includes the change information of the driving direction within the reference distance, the controller determines that the condition for performing the three-dimensional image mode is not satisfied.

6. The vehicle according to claim 5,
wherein the controller determines that the condition for performing the three-dimensional image mode is not satisfied when the received navigation information includes information of a steep curved road having a reference curvature or more within the reference distance.

7. A vehicle comprising:
a cluster including:
  a display panel; and
  a barrier panel disposed adjacent to the display panel and having a plurality of barriers;
an image obtainer disposed adjacent the cluster to acquire an image;
a steering wheel disposed adjacent the cluster and the image obtainer;
an input to receive a maintenance command of the three-dimensional image mode; and
a controller configured to:
  determine whether or not a condition for performing a three-dimensional image mode is satisfied based on a manipulation state of the steering wheel;
  control operations of the display panel and the barrier panel to recognize a user's line of sight based on the image of the image obtainer;
  perform the three-dimensional image mode based on the recognized line of sight of the user when the condition for performing the three-dimensional image mode is satisfied;
  control the operations of the display panel and the barrier panel to perform a two-dimensional image mode when the condition for performing the three-dimensional image mode is not satisfied,
wherein, when the maintenance command of the three-dimensional image mode is received through the input, the controller determines whether the user's line of sight is recognized during execution of the three-dimensional image mode, stops position adjustment of the plurality of barriers, and fixes the positions of the plurality of barriers when the user's line of sight is not recognized.

8. The vehicle according to claim 1, further comprising:
a detector to detect a rotation angle of the steering wheel,
wherein, when executing the two-dimensional image mode, the controller converts the two-dimensional image mode into the three-dimensional image mode when the detected rotation angle of the steering wheel is within a preset angle range.

9. The vehicle according to claim 1,
wherein the controller controls the cluster to display performance information of the two-dimensional image mode as a pop-up window when the condition for performing the three-dimensional image mode is not satisfied.

10. A display device comprising:
a display panel to output a three-dimensional image;
a barrier panel disposed adjacent the display panel and having a plurality of barriers;
an input to receive a maintenance command of the three-dimensional image mode;
a communication device configured to receive an image from an image obtainer; and
a controller configured to:
  recognize a user's line of sight from the image received through the communication device;
  adjust, when the user's line of sight is recognized from the image, positions of the plurality of barriers based on the recognized line of sight of the user; and
  stop, when the user's line of sight is not recognized from the image, the position adjustment of the plurality of barriers and fix the positions of the plurality of barriers to the last position,
wherein, when the maintenance command of the three-dimensional image mode is received through the input, the controller determines whether the user's line of sight is recognized during execution of the three-dimensional image mode, stops position adjustment of the plurality of barriers, and fixes the positions of the plurality of barriers when the user's line of sight is not recognized.

11. The display device according to claim 10,
wherein the input is configured to receive a converting command of a two-dimensional image mode, and
wherein, when the converting command of the two-dimensional image mode is received through the input, the controller determines whether the user's line of sight is recognized during the execution of the three-dimensional image mode, turns off of the barrier panel when the user's line of sight is not recognized, and controls an operation of the display panel to output a two-dimensional image.

12. The display device according to claim 11,
wherein the controller, when executing the two-dimensional image mode, turns off the barrier panel and controls the display panel to output the two-dimensional image.

13. The display device according to claim 10,
wherein the controller adjusts the positions of the plurality of barriers based on the recognized line of sight of the user during the execution of the three-dimensional image mode and stores adjustment values at the time of position adjustment of the plurality of barriers.

14. A control method of a vehicle, which includes a cluster having a display panel and a barrier panel, the method comprising steps of:
    determining, by a controller, whether a condition for performing a three-dimensional image mode is satisfied based on manipulation information of a steering wheel when a two-dimensional image converting command is received through an input;
    recognizing, by the controller, a user's line of sight based on an image of an image obtainer when the condition for performing the three-dimensional image mode is satisfied;
    controlling, by the controller, operations of the display panel and the barrier panel so that an image output mode of the cluster is performed as the three-dimensional image mode, based on the recognized line of sight of the user, and
    controlling, by the controller, when the condition for performing the three-dimensional image mode is not satisfied, operations of the display panel and the barrier panel so that the image output mode of the cluster is performed as a two-dimensional image mode,
    wherein the step of determining includes determining that the condition for performing the three-dimensional image mode is not satisfied when a turn-on command of a direction indicator is received through a lever.

15. The control method according to claim 14,
    wherein the performing the three-dimensional image mode includes:
    adjusting the positions of a plurality of barriers of the barrier panel based on the recognized line of sight of the user; and
    outputting a three-dimensional image through the display panel.

16. The control method according to claim 15,
    wherein the performing the two-dimensional image mode includes:
    turning off the barrier panel; and
    outputting a two-dimensional image through the display panel.

17. The control method according to claim 14,
    wherein the step of determining includes:
    detecting a rotation angle of the steering wheel; and
    determining that the condition for performing the three-dimensional image mode is satisfied when the detected rotation angle of the steering wheel is within a preset angle range.

18. The control method according to claim 14,
    wherein the step of determining includes:
    determining whether navigation information received from a vehicle terminal includes change information of the driving direction within a reference distance;
    determining that the condition for performing the three-dimensional image mode is not satisfied when the received navigation information includes the change information of the driving direction within the reference distance; and
    determining that the condition for performing the three-dimensional image mode is not satisfied when the received navigation information includes information of a curved road having a reference curvature or more within the reference distance.

19. The control method according to claim 14, further comprising:
    determining, by the controller, when a maintenance command of the three-dimensional image mode is received through the input, whether the user's line of sight is recognized based on manipulation information of the steering wheel during execution of the three-dimensional image mode;
    stopping position adjustment of a plurality of barriers and fixing the positions of the plurality of barriers when the user's line of sight is not recognized; and
    outputting a three-dimensional image through the display panel.

20. The control method according to claim 19,
    wherein the step of determining whether or not the user's line of sight is recognized includes:
    detecting a rotation angle of the steering wheel; and
    determining that the user's line of sight is not recognized when the detected rotation angle of the steering wheel deviates from a preset angle range, and
    wherein the control method further comprises:
    predicting, by the controller, that the user's line of sight will not be recognized when the turn-on command of the direction indicator is received through the lever; and
    predicting, by the controller, that the user's line of sight will not be recognized when navigation information received from a vehicle terminal includes change information of the driving direction within a reference distance.

21. The control method according to claim 14, further comprising:
    displaying, by the cluster, performance information of the two-dimensional image mode as a pop-up window when executing the two-dimensional image mode;
    detecting, by a detector, a rotation angle of the steering wheel; and
    converting, by the controller, the two-dimensional image mode into the three-dimensional image mode when the detected rotation angle of the steering wheel is within a preset angle range.

* * * * *